United States Patent
Curtis et al.

(10) Patent No.: US 10,775,545 B2
(45) Date of Patent: Sep. 15, 2020

(54) DISPLAY SYSTEM HAVING A PLURALITY OF LIGHT PIPES FOR A PLURALITY OF LIGHT EMITTERS

(71) Applicant: Magic Leap, Inc., Plantation, FL (US)

(72) Inventors: Kevin Curtis, Boulder, CO (US); Heidi Leising Hall, Webster, NY (US); Pierre St. Hilaire, Belmont, CA (US); David Tinch, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/442,564

(22) Filed: Feb. 24, 2017

(65) Prior Publication Data

US 2017/0248750 A1    Aug. 31, 2017

Related U.S. Application Data

(60) Provisional application No. 62/300,749, filed on Feb. 26, 2016.

(51) Int. Cl.
*G02B 26/00* (2006.01)
*G02F 1/03* (2006.01)
(Continued)

(52) U.S. Cl.
CPC .......... *G02B 6/0028* (2013.01); *G02B 6/001* (2013.01); *G02B 6/005* (2013.01); *G02B 6/0006* (2013.01);
(Continued)

(58) Field of Classification Search
CPC .............. G02B 26/0841; G02B 6/0028; G02B 27/149; G02B 27/0172; G02B 6/0055; G02B 6/0068; G02B 27/1046; G02B 27/145; G02B 6/0076; G02B 2027/0174; G02B 2027/0194; G02B 23/2461;
(Continued)

(56) References Cited

U.S. PATENT DOCUMENTS 5,268,823 A    12/1993  Yergenson
6,850,221 B1   2/2005   Tickle
(Continued)

FOREIGN PATENT DOCUMENTS

CN    104656358 A    5/2015
JP    2007-065080    3/2007
(Continued)

OTHER PUBLICATIONS

International Search Report and Written Opinion for PCT Application No. PCT/US2017/019526, dated May 10, 2017.
(Continued)

*Primary Examiner* — Brandi N Thomas
(74) *Attorney, Agent, or Firm* — Knobbe, Martens, Olson & Bear, LLP

(57) ABSTRACT

In some embodiments, a display system is provided. The display system comprises a plurality of light pipes and a plurality of light sources configured to emit light into the light pipes. The display system also comprises a spatial light modulator configured to modulate light received from the light pipes to form images. The display system may also comprise one or more waveguides configured to receive modulated light from the spatial light modulator and to relay that light to a viewer.

36 Claims, 17 Drawing Sheets

(51) Int. Cl.
| | | |
|---|---|---|
| *G02F 1/07* | (2006.01) | |
| *F21V 8/00* | (2006.01) | |
| *G02B 6/34* | (2006.01) | |
| *G02B 19/00* | (2006.01) | |
| *G02B 27/00* | (2006.01) | |
| *G02B 27/01* | (2006.01) | |
| *G02B 27/14* | (2006.01) | |

(52) U.S. Cl.
CPC ......... *G02B 6/0025* (2013.01); *G02B 6/0036* (2013.01); *G02B 6/0068* (2013.01); *G02B 6/0076* (2013.01); *G02B 6/34* (2013.01); *G02B 19/0028* (2013.01); *G02B 27/0081* (2013.01); *G02B 27/0172* (2013.01); *G02B 27/141* (2013.01); *G02B 2027/0114* (2013.01); *G02B 2027/0134* (2013.01); *G02B 2027/0174* (2013.01); *G02B 2027/0194* (2013.01)

(58) Field of Classification Search
CPC .. G02B 23/2469; G02B 27/017; G02B 6/002; G02B 6/0048; G02B 2027/0107
USPC .................................................. 359/619–633
See application file for complete search history.

(56) References Cited

U.S. PATENT DOCUMENTS

| | | | |
|---|---|---|---|
| 8,950,867 | B2 | 2/2015 | Macnamara |
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt |
| 9,835,858 | B2 | 12/2017 | Nambara |
| 9,851,563 | B2 | 12/2017 | Gao et al. |
| 9,857,591 | B2 | 1/2018 | Welch et al. |
| 9,874,749 | B2 | 1/2018 | Bradski |
| 2005/0002097 | A1 | 1/2005 | Boyd et al. |
| 2005/0225866 | A1 | 10/2005 | Abu-Ageel |
| 2006/0126178 | A1 | 6/2006 | Li |
| 2007/0007442 | A1 | 1/2007 | Wenstrand et al. |
| 2007/0081329 | A1 | 4/2007 | Chua et al. |
| 2008/0232133 | A1* | 9/2008 | Segawa ................. G02B 6/002 362/610 |
| 2008/0285310 | A1 | 11/2008 | Aylward et al. |
| 2008/0291668 | A1 | 11/2008 | Aylward et al. |
| 2010/0027289 | A1 | 2/2010 | Aiki et al. |
| 2010/0118276 | A1 | 5/2010 | Li |
| 2010/0128155 | A1* | 5/2010 | Ahn ..................... G01J 3/0259 348/308 |
| 2011/0019258 | A1 | 1/2011 | Levola |
| 2011/0149591 | A1 | 6/2011 | Smith |
| 2011/0227487 | A1 | 9/2011 | Nichol et al. |
| 2012/0127062 | A1 | 5/2012 | Bar-Zeev et al. |
| 2012/0169235 | A1 | 7/2012 | Dassanayake et al. |
| 2012/0242959 | A1 | 9/2012 | Huang |
| 2013/0006074 | A1 | 1/2013 | Pologe |
| 2013/0082922 | A1 | 4/2013 | Miller |
| 2013/0125027 | A1 | 5/2013 | Abovitz |
| 2013/0215636 | A1 | 8/2013 | Angelini et al. |
| 2013/0335821 | A1 | 12/2013 | Robinson et al. |
| 2014/0071539 | A1 | 3/2014 | Gao |
| 2014/0140654 | A1 | 5/2014 | Brown et al. |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0138510 | A1* | 5/2015 | Domm ............... G02B 27/1026 353/31 |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1* | 12/2015 | Welch ................ G02B 27/0172 345/8 |
| 2016/0011419 | A1 | 1/2016 | Gao |
| 2016/0026253 | A1 | 1/2016 | Bradski et al. |

FOREIGN PATENT DOCUMENTS

| | | |
|---|---|---|
| JP | 2009-26743 | 2/2009 |
| JP | 2014-132328 | 7/2014 |
| JP | 2015-4825 | 1/2015 |
| WO | WO 2017/147534 | 8/2017 |

OTHER PUBLICATIONS

International Preliminary Report on Patentability for PCT Application No. PCT/US2017/019526, dated Aug. 28, 2018.
European Extended Search Report, re EP Application No. 17757385.4, dated Aug. 16, 2019.

* cited by examiner

DISPLAY SYSTEM HAVING A PLURALITY OF LIGHT PIPES FOR A PLURALITY OF LIGHT EMITTERS

CROSS-REFERENCE TO RELATED APPLICATIONS

This application claims the benefit of priority under 35 U.S.C. § 119(e) of U.S. Provisional Application No. 62/300,749, filed on Feb. 26, 2016, entitled "DISPLAY SYSTEM HAVING A PLURALITY OF LIGHT PIPES FOR A PLURALITY OF LIGHT EMITTERS," the disclosure of which is hereby incorporated by reference in its entirety.

This application also incorporates by reference the entirety of each of the following patent applications and publications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to display devices and, more particularly, to display devices utilizing light pipes to deliver light from light emitters.

Description of the Related Art

Display devices may form images by modulating light from a light emitter and directing the modulated light to a viewer. As a result, the quality and brightness of the images may depend upon the quality of the light received by a light modulator from the light emitter. Providing light output of adequate quality may be particularly challenging in the context of augmented reality and virtual reality systems in which multiple views of an image are generated.

Accordingly, there is a continuing need for systems and methods of providing high quality light to a light modulator, including light modulators for augmented reality and virtual reality systems.

SUMMARY

In some embodiments, a display system is provided. The display system comprises a plurality of light pipes and a plurality of light sources configured to emit light into the light pipes. The display system also comprises a spatial light modulator configured to modulate light received from the light pipes to form images. The display system may also comprise one or more waveguides configured to receive modulated light from the spatial light modulator and to relay that light to a viewer.

In some other embodiments, a display system is provided. The display system comprises a partially transmissive reflector; a first light source; and a first light pipe proximate to and configured to: receive light from the first light source; and direct the light from the first light source to the reflector in a first direction. The display system also comprises a second light source; a second light pipe proximate to and configured to: receive light from the second light source; and direct the light from the second light source to the reflector in a second direction. The partially transmissive reflector is configured to: transmit light from the first light source; and reflect light from the second light source.

In yet other embodiments, a method for forming an optical device is provided. The method comprises forming a light pipe with a roughened sidewall surface; coupling the light pipe to a light emitter; and coupling an assembly comprising the light pipe and the light emitter to a spatial light modulator.

Figure 1:
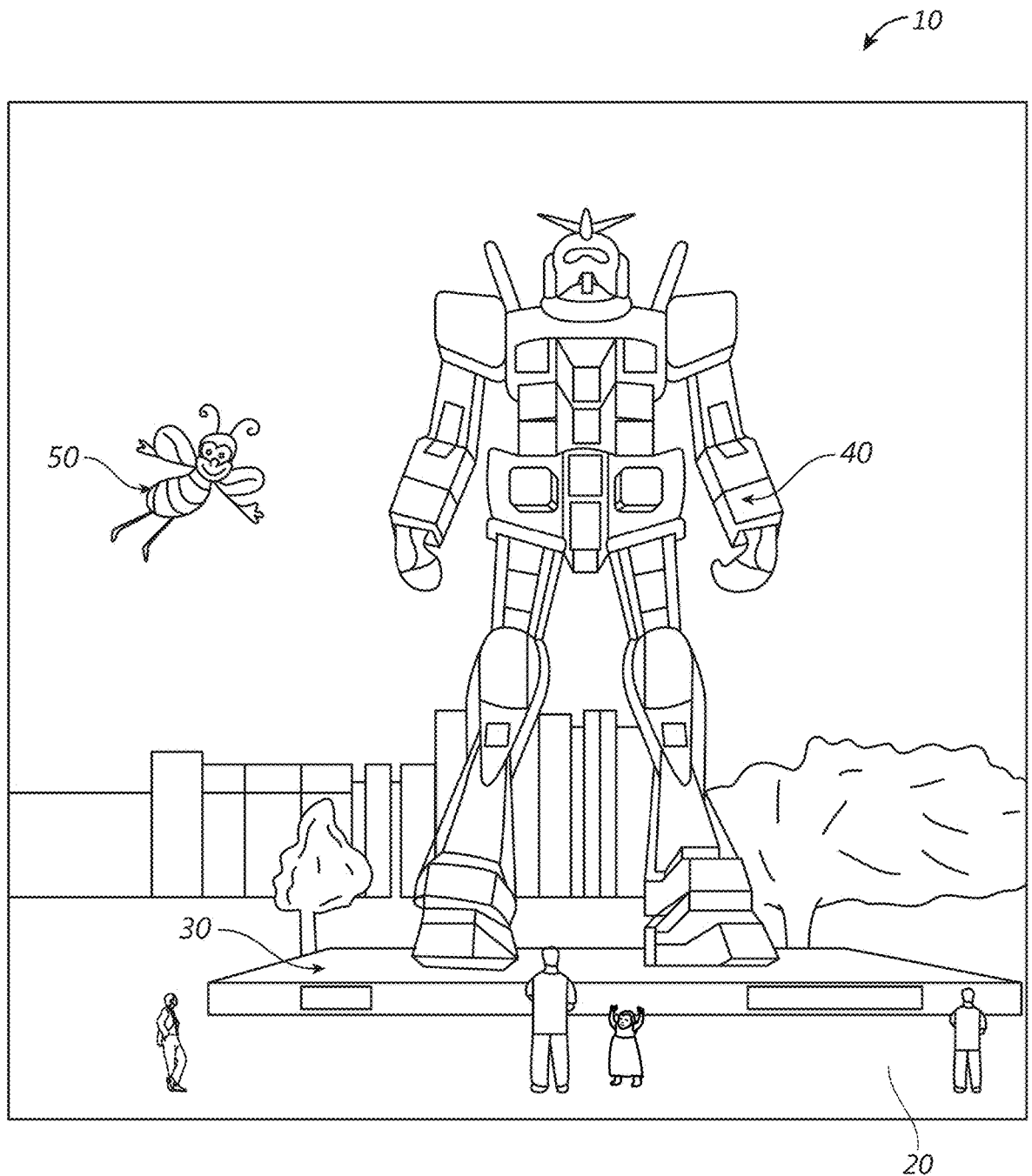
FIG. 1 illustrates a user's view of augmented reality (AR) through an AR device.

The drawings are provided to illustrate example embodiments and are not intended to limit the scope of the disclosure.

DETAILED DESCRIPTION

According to some embodiments, a light module for providing light to a light modulator, such as a spatial light modulator, includes a plurality of light emitters and light pipes. Each of the light emitters may have an associated light pipe that transmits light from the light emitter to the light modulator. The light modulator may be configured to modulate light received from the light pipes and this modulated light is ultimately outputted or projected to a viewer, who perceives an image when their eye receives the modulated light. Thus, an assembly including the light module and the light modulator may be referred to as a projector.

In some embodiments, each light pipe is configured to direct light to a unique corresponding light-modulating area on the light modulator, from which the light propagates to a unique corresponding light input area on an eyepiece that directs the light to the viewer. Consequently, a display system may have a plurality of light pipes, each associated with a plurality of light modulating areas on a light modulator, which in turn are associated with a plurality of light input areas on an eyepiece. For example, each of the light pipes may be spatially arranged to align uniquely (possibly through other optical structures) with a light input area associated with a given light pipe. As a result, there may be a one-to-one correspondence between a light pipe, an area on the light modulator, and a light input area on the eyepiece. In some embodiments, the eyepiece may be a stack of waveguides, with each waveguide including at least one of the light input areas.

In some embodiments, at least some of the waveguides may be configured to emit light of different colors and/or may have different optical power than other waveguides. For example, each of the light emitters directing light into the light pipes may emit light of a particular range of wavelengths that may correspond to different colors. For example, different light emitters may emit light of different wavelengths corresponding to 3 or more colors, e.g. the colors red, green, and blue. These different colors may be component colors that form a full color image when perceived by the same viewer. In addition or alternatively, some of the waveguides of the eyepiece may have different optical power and may output light to a viewer with different amounts of divergence, which may be perceived by the viewer as corresponding to different depth planes in embodiments where the display device provides a three-dimensional rendering of an image.

In some embodiments, the light source may be a discrete light emitter, such as a light emitting diode (LED). Each light pipe may have an associated light emitter. In some embodiments, one or more light pipes may have multiple associated light emitters. In some embodiments, multiple light pipes may be formed as an integral unit.

Advantageously, the light pipes may output light with high spatial uniformity and high angular uniformity. Without being limited by theory, the reflection of light off the wall of a light pipe as the light propagates in the light pipe may aid in homogenizing the light, thereby providing light that is more spatially and angularly uniform than the light generated and originally emitted by the light emitter. In some embodiments, optical structures, such as diffusive structures, may be provided at the light input and/or light output surfaces of the light pipe to further improve the uniformity of the light output. In addition, in some embodiments, the light pipe may have different dimensions and/or cross-sectional shapes at their light input and light output surfaces or ends, thereby allowing light emitters and light modulators having different cross-sectional shapes to be effectively coupled together. Also, in some embodiments, the cross-sectional areas of some of the light pipes may be different from the cross-sectional areas of others of the light pipes, and/or the heights of the light pipes may vary, which may facilitate the transmission and appropriate focusing of light of different wavelengths to a light modulator; for example, the height of the light pipe may be selected based upon the wavelengths of the light that is injected into the light pipe. It will be appreciated that light of smaller wavelengths may be effectively transmitted by a shorter light pipe than light of longer wavelengths, to maintain a desired separation between a light emitter and an area, e.g., in a waveguide, onto which the light exiting the light pipe will be directed. In addition, the cross-sectional areas of the light input surfaces of the light pipes may be varied depending upon the sizes of the light emitters to which the light pipes are coupled, and the cross-sectional areas of the light output surfaces of the light pipes may also be vary depending upon the sizes of the optical features (e.g., incoupling optical elements) configured to receive light from light pipes.

Reference will now be made to the drawings, in which like reference numerals refer to like parts throughout.

Example Display Systems

With reference to FIG. 1, an augmented reality scene 1 is depicted. It will be appreciated that modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 20 featuring people, trees, buildings in the background, and a concrete platform 30. The user also perceives that he "sees" "virtual content" such as a robot statue 40 standing upon the real-world platform 1120, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Figure 2:
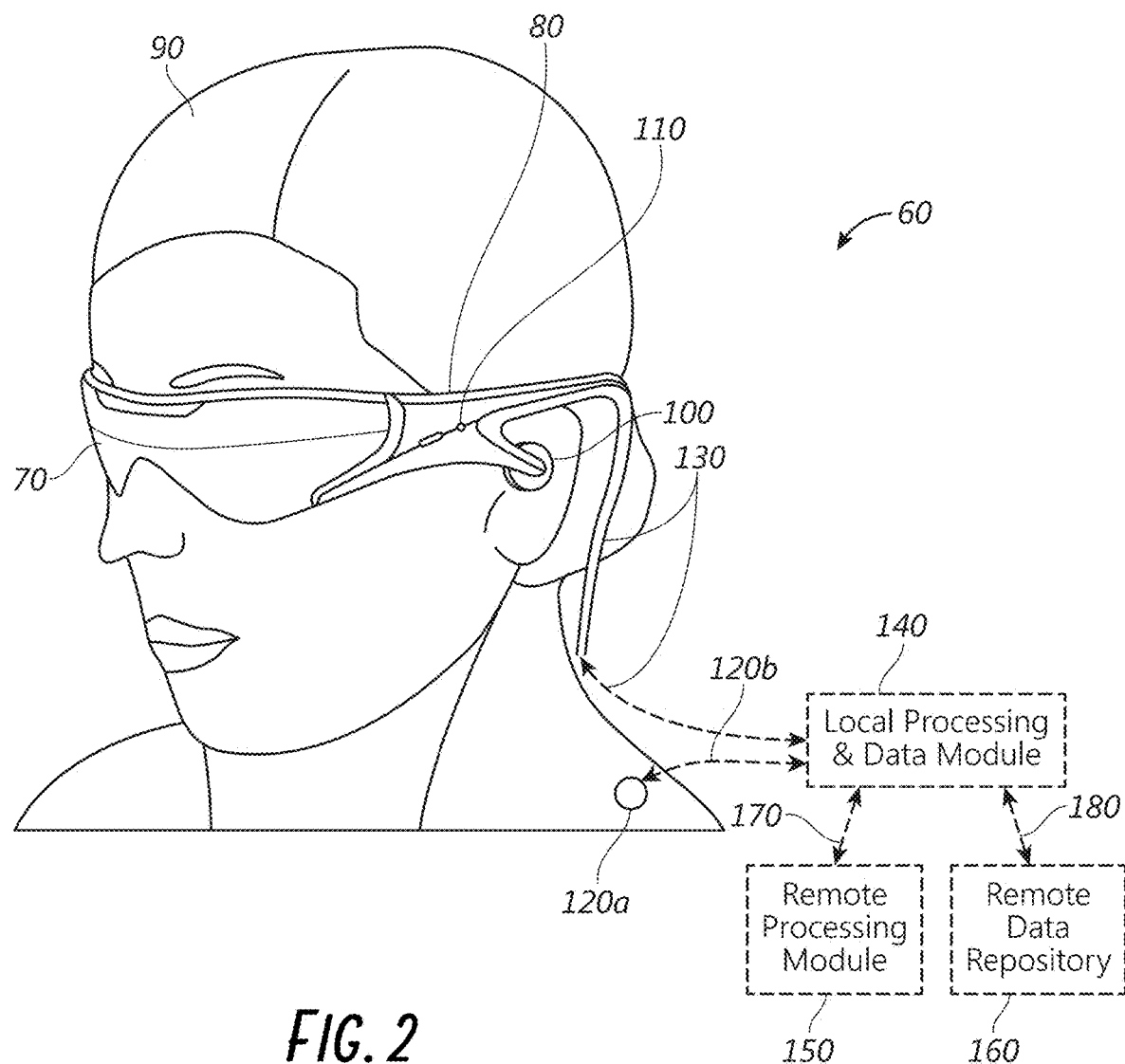
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
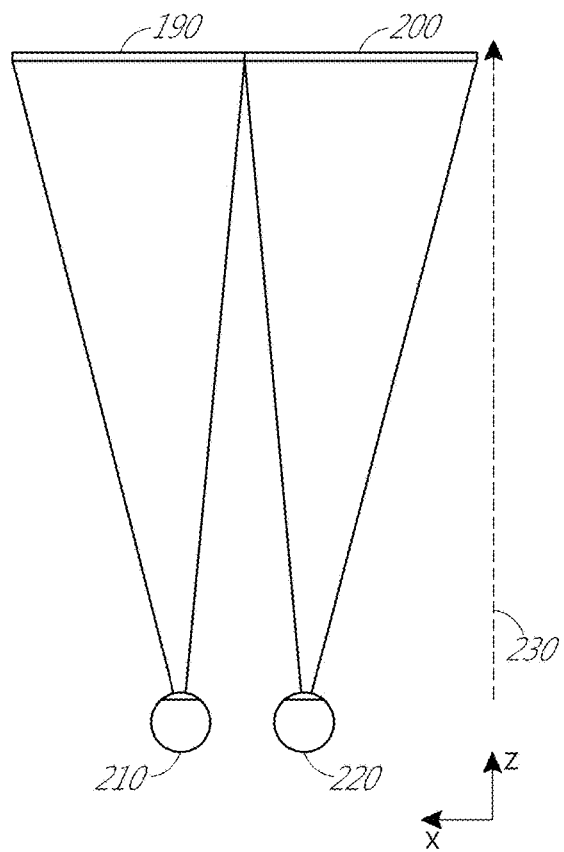
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
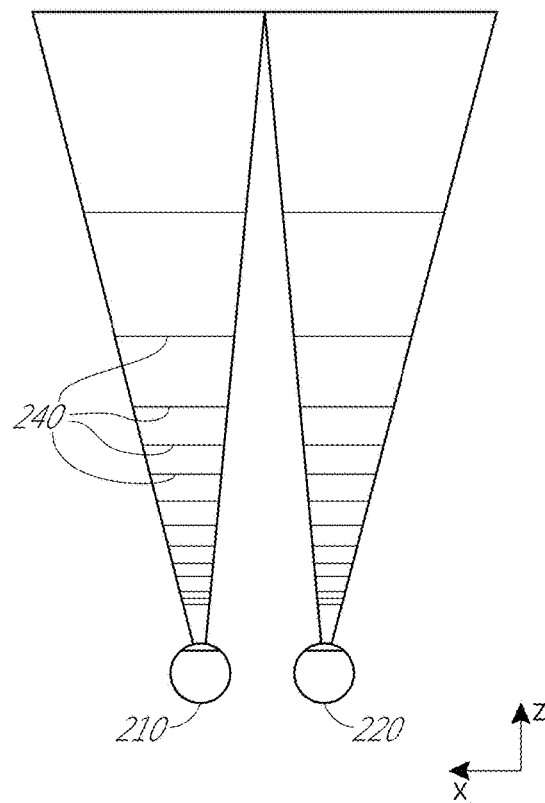
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
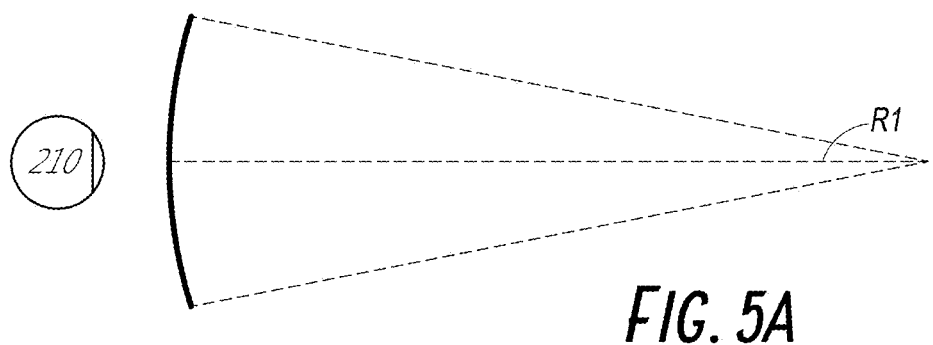
FIGS. 5A-5C illustrate relationships between radius of curvature and focal radius.
Figure 5B:
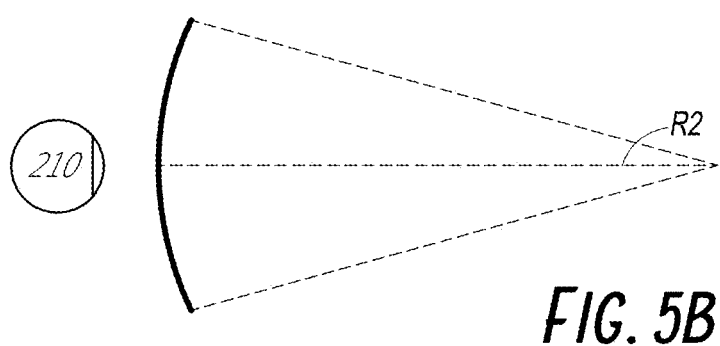
Figure 5C:
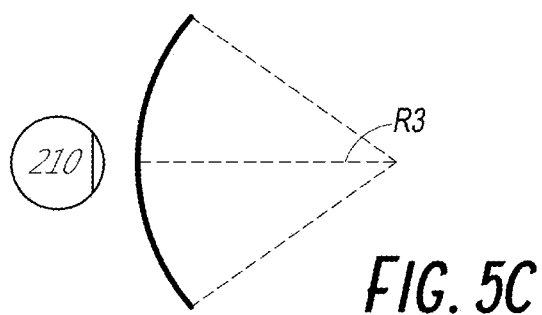

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
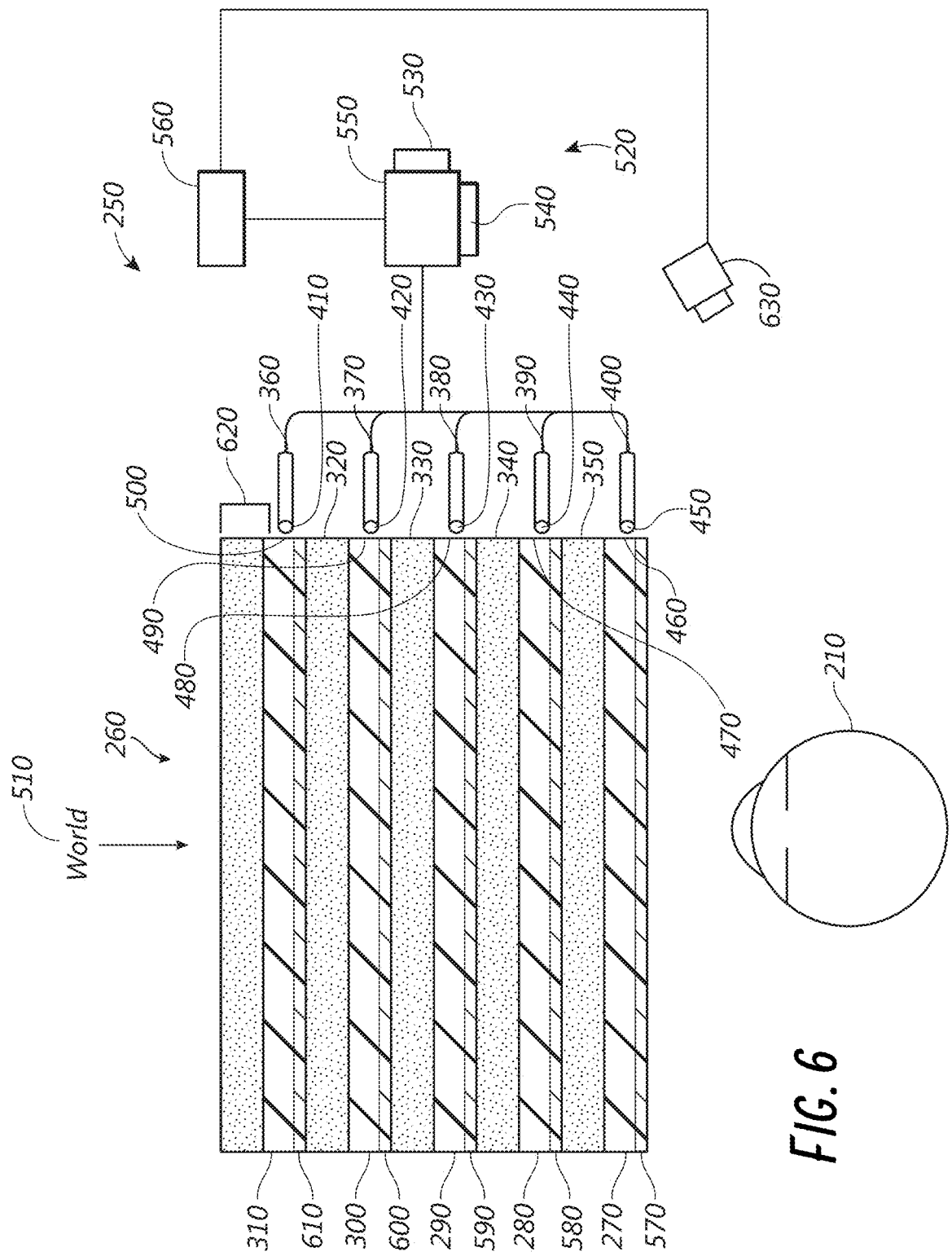
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, as noted herein, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and portions of a common projection system configured to output light into associated ones of the waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
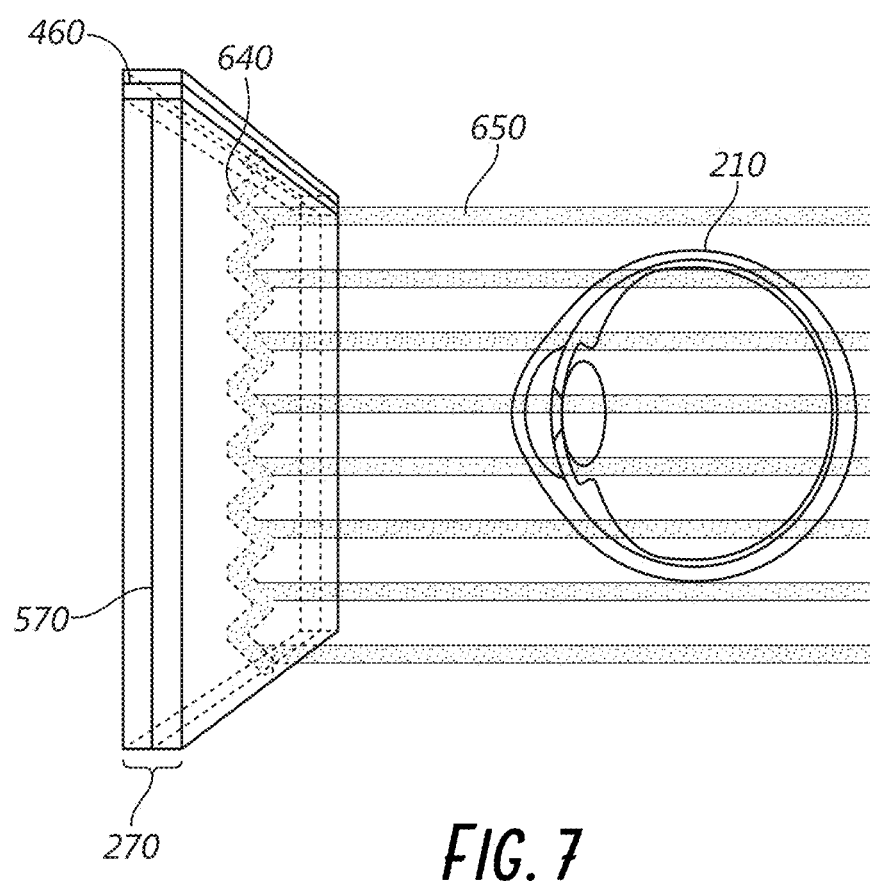
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
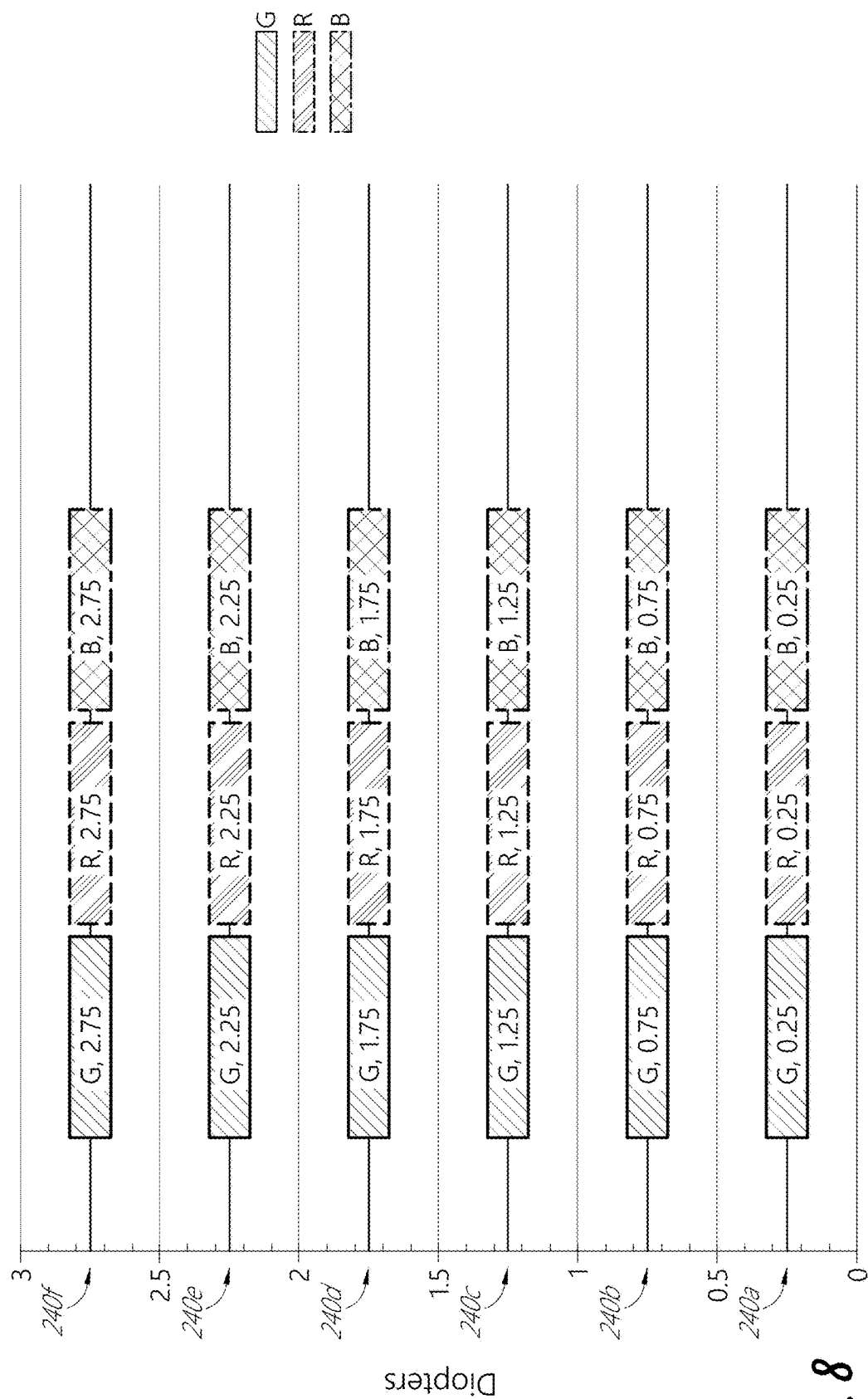
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
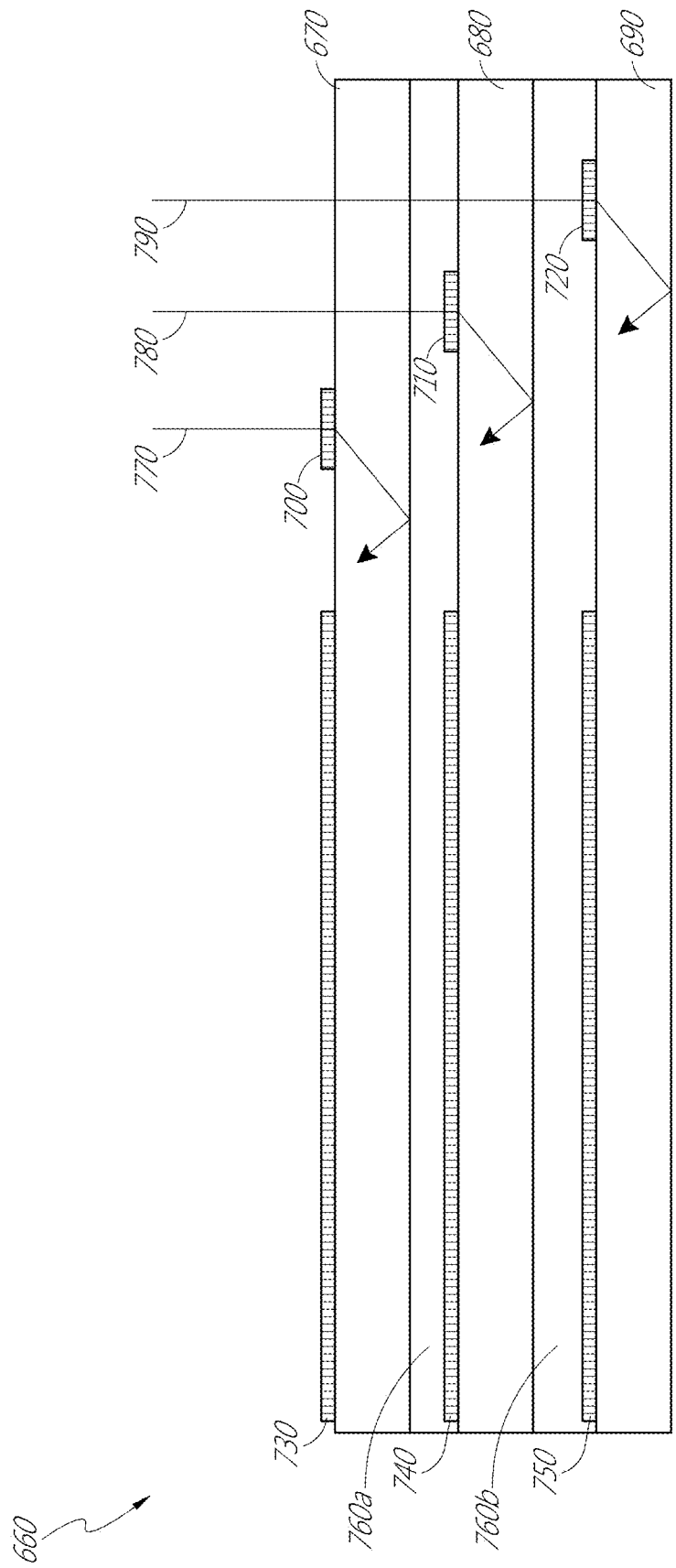
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
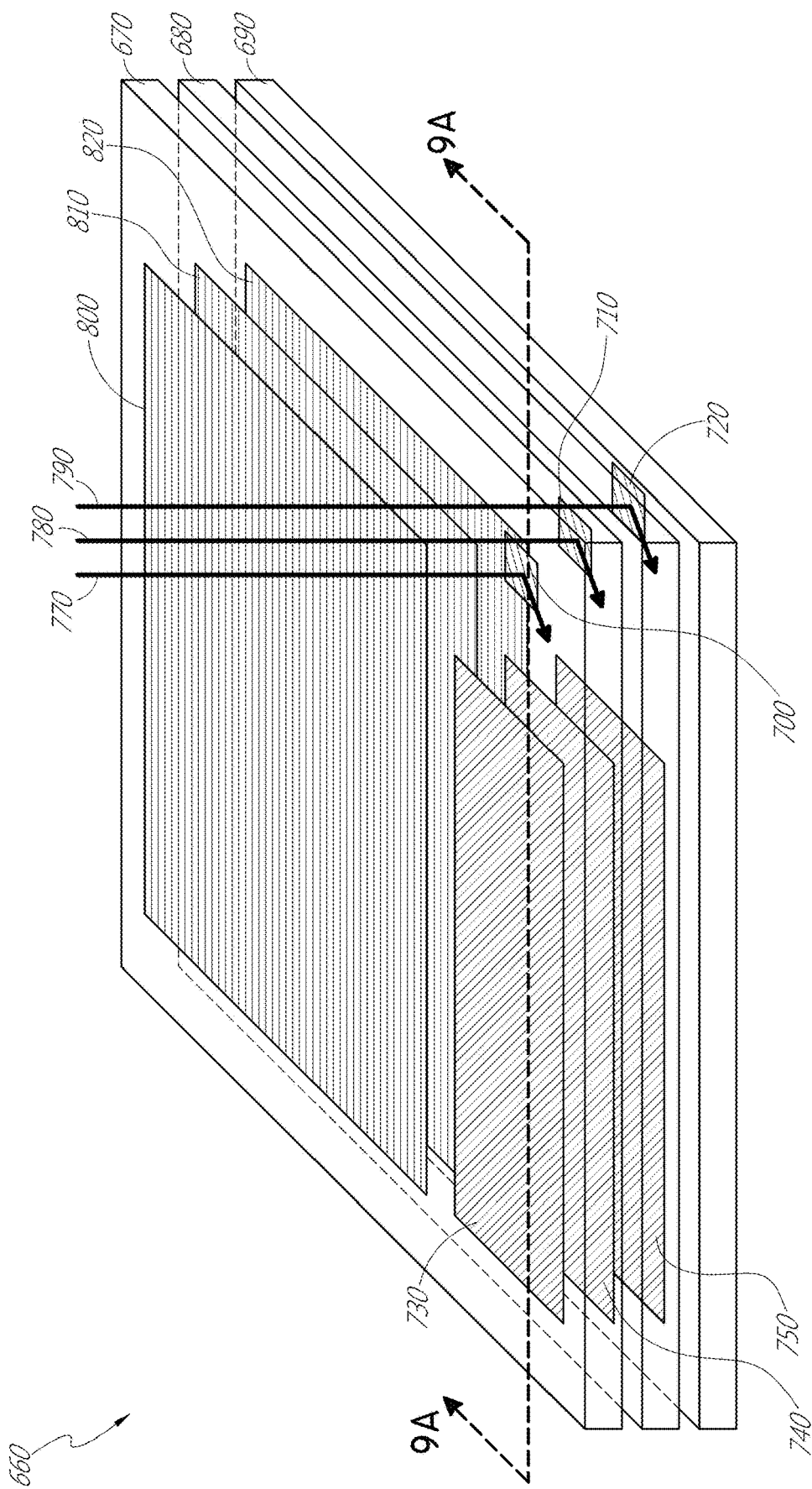
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
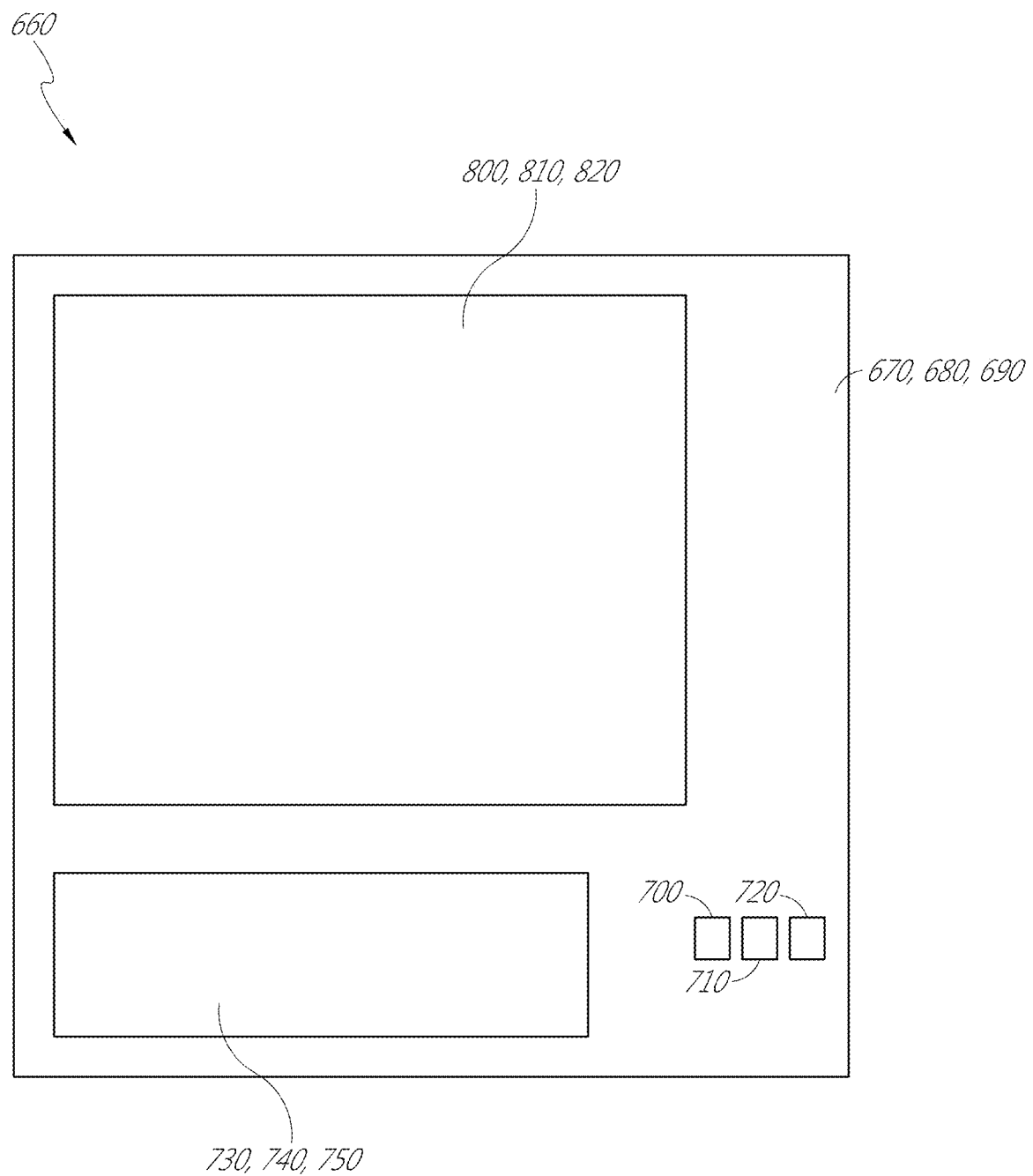
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Example Light Projector Systems and Related Structures

Figure 10:
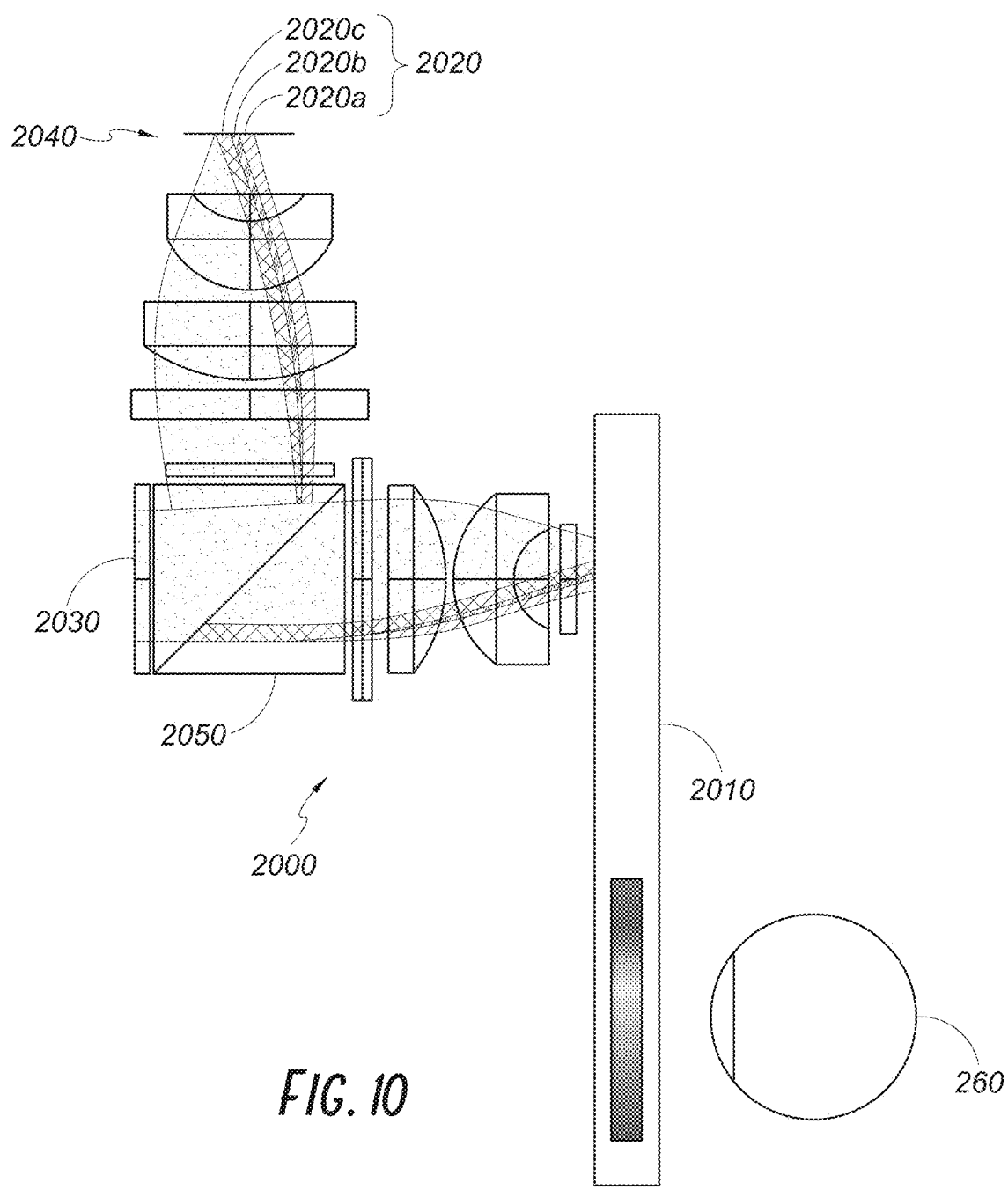
FIG. 10 illustrates a cross-sectional view of a light projector system and a waveguide for directing light to a viewer.

FIG. 10 illustrates a cross-sectional view of a light projector system 2000 and an eyepiece 2010 for directing light to a viewer's eye 210. As discussed herein, multiple light emitters 2020 (e.g., multiple LEDs) may be used to illuminate a spatial light modulator (SLM) 2030. The light emitters 2020 may be part of the light module 2040. In some embodiments, a beam splitter (e.g., a polarizing beam splitter (PBS)) 2050 may be used to reflect light from the light emitters 2020 to the spatial light modulator 2030, which reflects and modulates the light. The modulated light from the SLM 2030 may then propagate through the beam splitter 2050 to the eyepiece 2010, which may include one or more waveguides. In some embodiments, the eyepiece 2010 may correspond to the waveguide stack 260 (FIG. 6) or 660 (FIG. 9A-9C). The waveguides of the eyepiece 2010 relay or guide and output the light to the viewer's eye 210. In addition, it will be appreciated that the light projector system 2000 may correspond to the light projector system 520 (FIG. 6).

The light module 2040 may include a plurality of light emitters 2020 that emit light of different ranges of wavelengths, corresponding to different colors. Different sets of the plurality of light emitters 2020 (e.g., light emitters 2020a, 2020b, 2020c) may emit light of different ranges of wavelengths, with a set of light emitters including one or more light emitters 2020. In some embodiments, the total number of sets of light emitters 2020 may correspond to the total number of component colors used by the display system to form a full color image.

The perception of a full color image by a viewer may be achieved with time division multiplexing in some embodiments. For example, different light emitters 2020 may be activated at different times to generate different component color images. In such embodiments, the component color images that form a single full color image may be displayed sufficiently quickly that the human visual system does not perceive the component color images as being displayed at different times. For example, the rate at which the component color images are sequentially displayed may be higher than the perception persistence of the human visual system. In some embodiments, the different component color images are sequentially displayed at a rate higher than 60 Hz. It will be appreciated that time division multiplexing may advantageously reduce the computational load on processors (e.g., graphics processors) utilized to form a displayed images. In some embodiments, where sufficient computational power is available, all component color images that form a full color image may be displayed simultaneously.

With continued reference to FIG. 10, the different color light emitters 2020 (e.g., red, green and blue LEDs) may be located at different locations and used to illuminate the SLM 2030 and then are imaged back through the beam splitter 2050 onto the eyepiece 2010. In some embodiments, the SLM 2030 may be based on micro electro mechanical technology (MEMs) or liquid crystal technology or other switching technology. Since the optics of the light projector system 2000 approximately images the individual light sources into the eyepiece 2010 in some embodiments, the images of the light emitters are spatially separate on the eyepiece 2010.

As disclosed herein, the eyepiece 2010 may include a plurality of waveguides for each color of a plurality of colors. An individual waveguide may incouple the desired light from the corresponding light emitter and relay it to the eye by use of diffractive optics (e.g., diffractive gratings) or physical optics (e.g., faceted reflectors). In addition, diffractive or physical optics may direct the light through a waveguide, and may also couple the light out of the waveguide. The waveguides may have power in the relay to the eye to make the light seem to come from a given depth or distance from the viewer, as discussed herein (see, e.g., FIGS. 6-9C and related discussion).

Figure 11:
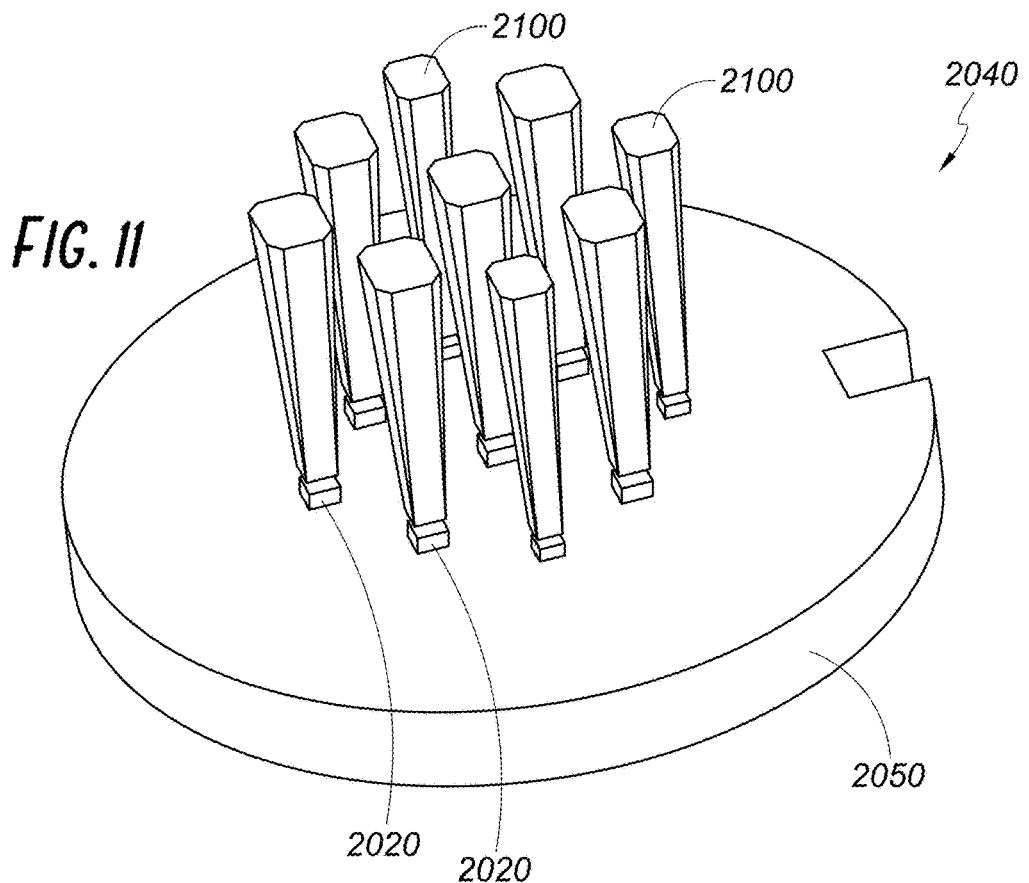
FIG. 11 illustrates a perspective view of a light module having a plurality of light emitters and a plurality of light pipes.

FIG. 11 illustrates a perspective view of the light module 2040 having a plurality of light emitters 2020 and a plurality of light pipes 2100. The light emitters 2020 are disposed on a substrate 2050 and may each emit light of a wavelength corresponding to one of a plurality of colors. As illustrated, the light pipes 2100 may be arranged as spaced-apart pillars extending from the light emitters 2020. As illustrated, individual ones of the light pipes 2100 may be coupled to an associated one of the light emitters 2020. It will be appreciated that the light pipes 2100 may be formed of an optically transmissive material. Examples of optically transmissive materials include glasses and optical grade polymeric materials (e.g., poly(methyl methacrylate) (PMMA) and other acrylics, and polycarbonate).

Figures 12A, 12B:
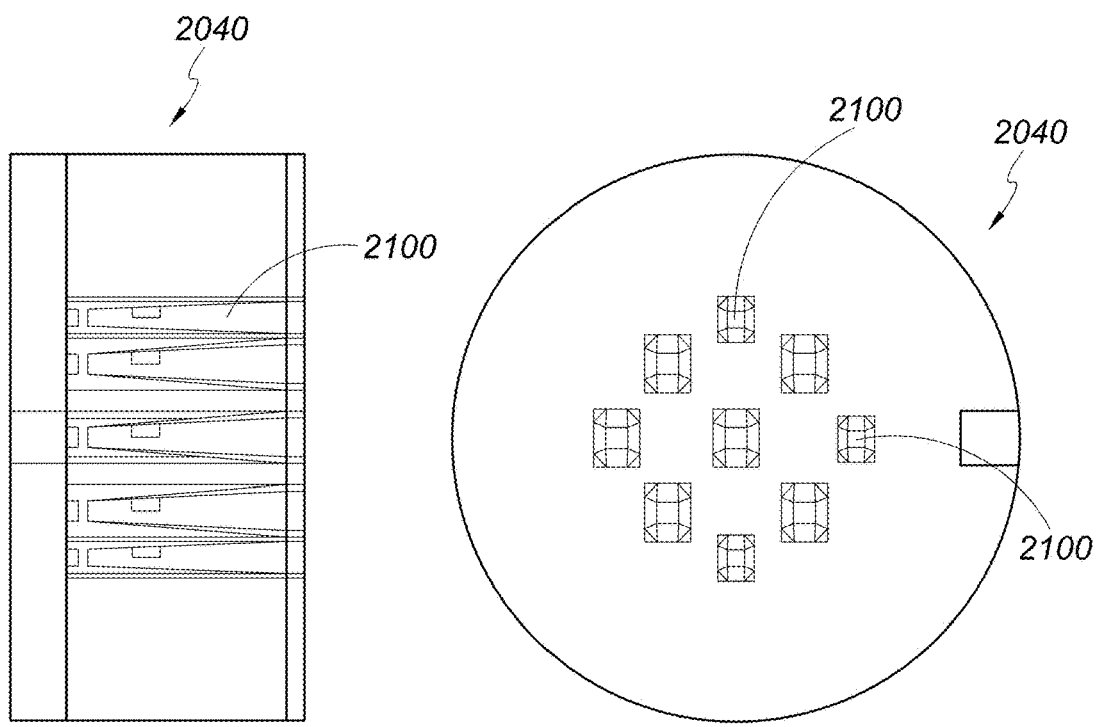
FIGS. 12A and 12B illustrate cross-sectional side and top down plan views, respectively, of the light module of FIG. 11.

FIGS. 12A and 12B illustrate cross-sectional side and top down plan views, respectively, of the light module 2040 of FIG. 11. As illustrated, some of the light pipes 2010 may have different cross-sectional areas from others of the light pipes 2010. It will be appreciated that the cross-sectional areas may be taken transverse to the lengths or heights of the light pipes 2010. In some embodiments, the cross-sectional areas may be related to the wavelengths of light to be transmitted by the light pipes 2010, with smaller cross-sectional areas corresponding to lower wavelengths. Consequently, in some embodiments, the cross-sectional areas of the light pipes 2010 are related to the wavelengths of light that an underlying coupled light emitter 2020 is configured to emit, with the cross-sectional area decreasing with decreasing wavelength, particularly where light emitters 2020 emitting light of different colors have different sizes.

Figure 13A:
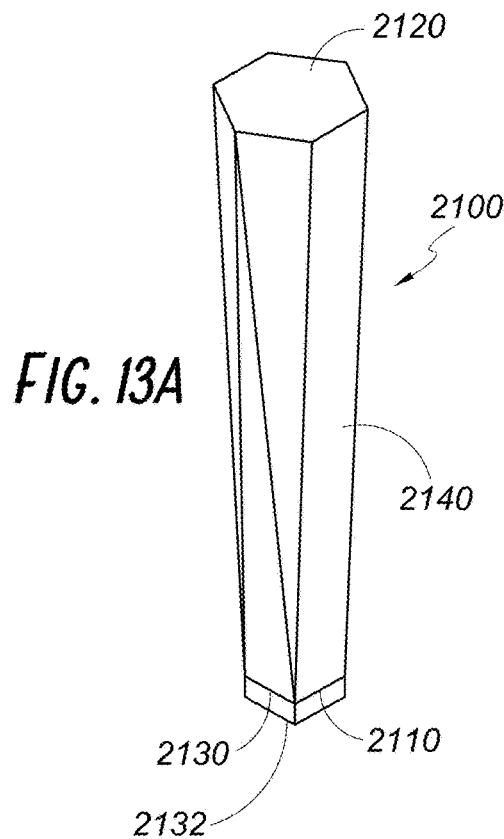
FIGS. 13A and 13B illustrate perspective views of light pipes.

FIG. 13A illustrates a perspective view of a light pipe. The light pipe 2100 includes a light input surface 2110 for receiving light from a light emitter, and a light output surface 2120 for outputting light, such as to a light modulator (e.g., the spatial light modulator 2030, FIG. 10). The light input surface 2110 may have a cross-sectional shape that substantially matches the cross-sectional shape of the light emitter, e.g., the light emitter may have a square or rectangular shape and the light input surface 2110 may also have a square or rectangular shape. In addition, the light input surface 2110 may be sized similarly to the light emitter in some embodiments. For example, the light input surface 2110 may have an area that is within 5%, 10%, or 25% of the area of the surface of light emitter the surface 2110. The light output surface 2120 may have a different size and/or shape from the light input surface 2110. For example, the light output surface 2120 may have a larger area than the light input surface 2110. In some embodiments, the light output surface 2120 may have a size that matches the in-coupling optical element 700, 710, 720 (FIG. 9A-9C) into which the light pipe 2100 is configured to output light.

Advantageously, the light pipe 2100 can significantly increase the fraction of light from the light emitter 2020 (FIG. 10) that may be captured by the light projector system 2000 and used effectively to project an image to the viewer 260. The light pipe 2100 may also make the transmitted light more homogeneous and uniform, e.g., due to mixing of the light as it propagates through the light pipe 2100 reflects off surfaces of the light pipe 2100. In addition, due to the ability to provide differently shaped and sized input and output surfaces 2110, 2120, the light pipe 2100 can taper the light to the desired numerical aperture (na) and size to facilitate, e.g., interfacing with a light modulator. For example, the input and output surfaces 2110, 2120 may have different shapes and, as such, may have different numbers of sidewalls which, e.g., taper towards the input or output surface having a smaller number of sidewalls. It will be appreciated that the sidewalls may also define an interior width of the light pipe 2100, the interior width being the smallest dimension of a cross-section of the light pipe 2100, the cross-section taken along a plane orthogonal to the height axis from the input to the output surfaces of the light pipe 2100. In some embodiments, the interior width may vary across the height of the light pipe 2100.

With continued reference to FIG. 13A, in some embodiments, the light pipe 2100 may be used with quantum dot films or phosphor films 2130 which may be pumped using light emitters, e.g., blue light emitters and/or blue lasers to emit light of other desired wavelengths. For example, the light emitter 2020 associated with a particular light pipe 2100 may be configured to emit light of a wavelength suitable for exciting the quantum dot film or phosphor film 2130 of that light pipe 2100. In some embodiments, all light emitters 2020 of the light module 2040 may be configured to emit light of the same range of wavelengths and differences in the wavelengths of light emitted by a light pipe 2100 may be due to the use of different quantum dots or phosphor films 2130 which are configured to emit light of different ranges of wavelengths. The light pipe input surface 2110 may be placed as close as possible to the phosphor or quantum dot film to increase the capture of light emitted by the quantum dots or phosphor films. In some embodiments, the light pipe input surface 2110 may be in optical or physical contact, or fabricated together with the quantum dots or phosphor films 2130. In some embodiments, a dichroic mirror 2132 may optionally be provided under the quantum dots or phosphor films 2130, that is between the light emitter 2020 and the quantum dots or phosphor films 2130. Such a dichroic mirror may advantageously increase the amount of light that is injected into the light pipe 2100 from the quantum dots or phosphor films 2130 by, e.g., reflecting light emitted by the quantum dots or phosphor films 2130 into the light pipe 2100 while also transmitting light from the light emitter 2020 to excite the quantum dots or phosphor films 2130. In some embodiments, the quantum dot films or phosphor films 2130 may be omitted, and light from light emitters 2020 may be coupled into the light pipes 2100 without changing the wavelengths of that light.

With continued reference to FIG. 13A, as noted above in some embodiments, the light input surface 2110 may be situated on top of the light emitter as close as possible to the emitting surface of a light emitter 2020 (FIG. 11). In some embodiments, the light input surface 2110 may be glued onto the light emitter, preferably with an index-matched adhesive, to better index match the two structures and to increase light collection efficiency by the light pipe 2100. In some other embodiments, no index-matched adhesive is utilized. For example, the light input surface 2110 may be glued onto the light emitter with a adhesive that has a significantly different (e.g., lower) refractive index than both the light pipe 2100 and the light emitter. In some other embodiments, an air gap may be provided between the light pipe 2100 and the light emitter. Unexpectedly, it has been found that with a large mismatch, such as provided by the air gap, the efficiency of the light transmission from the light emitter to the light pipe and on to a light modulator is higher than if an index-matching adhesive were utilized.

Figure 13B:
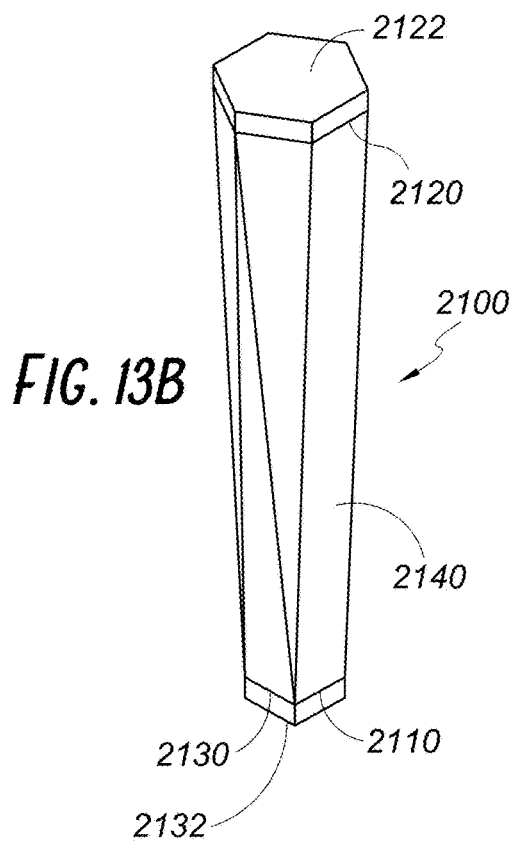

In some embodiments, the sub pupil formed by the cross-sectional area of the light output surface 2120 may be a circle, oval, square or rectangle or some straight line approximation to these forms. FIG. 13A shows the light output surface 2120 with a hex approximation to a circle. Typically, the input surface 2110 is the same size or smaller than the output surface 2120. In some other embodiments, the shape of the light guide 2100 may be varied to provide an output with a desired angular spread in x and y axes to efficiently illuminate the SLM (e.g. SLM 2030, FIG. 10) in the system. For example, a SLM that has an 4:3 aspect ratio is better covered by output angles with a ratio of 4:3 in the long direction to short direction of the SLM. This may result in a more oval or rectangular output shape of the light pipe with a length:width ratio of approximately 4:3. In some embodiments, as shown in FIG. 13B, the output surface 2120 of the light pipe 2100 may have a diffuser 2122 near it or fabricated onto the output surface 2120 to improve angular uniformity. For example, the diffuser may be formed of a piece of material that is optically coupled (e.g., bonded by an index-matched adhesive) to the output surface 2120. In some embodiments, the diffuser may comprise a material that diffuses light within the volume of that material and/or may include surface features that diffuse light. In some embodiments, the surface features may be formed directly on the output surface 2120. In some embodiments, a flange (not shown) maybe molded towards the top of the light pipe 2100 to facilitate mounting the light pipe 2100 into a mechanical part to hold on top of the light emitter and to shield and baffle stray light.

With continued reference to FIGS. 13A and 13B, as discussed herein, the cross-sectional shape of the light pipe may be any shape, including rectangular, square, hex or circular, and may change from the light input surface 2110 to the light output surface 2120. For example, the illustrated shape progresses from square to a hex shape with tapered facets to improve light output uniformity. It will be appreciated that the light input surface 2110 may have a shape that matches an underlying light emitter, while the light output surface 2120 may have a shape configured to provide a length to width ratio that provides an angular spread for efficiently illuminating an SLM. In addition, in some embodiments, the size of the light output surface 2120 and, thus, the size of the area illuminated by the light exiting the light pipe 2100, may be determined such that, upon propagating through various optical structures to the reach a waveguide, the outputted light extends over an area that substantially matches the area of the incoupling optical element of the waveguide. In some embodiments, the sidewalls 2140 of the light pipe 2100 may be coated with a cladding layer to facilitate the propagation of light in the light pipe 2100.

In some embodiments, as discussed further below, each light pipe may be surrounded with a light absorbing material to reduce color crosstalk. In some embodiments, the underlying light emitters may include an encapsulation material that may be separated or mostly separated between light emitters and a light absorbent material may be placed around the light emitter encapsulation between light emitters.

The output and input surfaces 2120, 2110 may include various features. For example, as disclosed herein, the output surface 2120 of the light pipe 2100 may have a diffuser fabricated into it or attached to it to improve the uniformity of the outputted light. Both or either output and input surfaces 2120, 2110 may have an anti-reflection coating to improve light throughput. It will be appreciated that the light emitter underlying the light pipe 2100 may be encapsulated by a material which provides mechanical protection and electrical insulation for the light emitter (e.g, for the wire bonds of the light emitter). In some embodiments, the input surface 2110 may be fabricated as part of the light emitter encapsulation so that it is better index matched than having an air interface between them, thereby improving light throughput from the light emitter into the light pipe 2100.

In some embodiments, the length of the light pipe 2100 or light emitter/light pipe position may be changed along the light output axis of the projector system so that the particular sub pupil may be in better focus at the desired waveguide in a stack of waveguides (e.g. waveguide stacks 260 (FIG. 6) or 660 (FIG. 9A-9C)) of the eye piece. This may help to reduce color or depth layer crosstalk when light from the wrong sub pupil (e.g. from a light pipe not specifically configured to direct light into a particular waveguide) is collected by the wrong waveguide in the eyepiece. By changing the sub pupil location in z-axis (along the length or height direction of the illustrated light pipe 2100) the sub pupils will be nearer or in focus at the correct waveguide, which may result in less overlap in incident light beams and waveguide incoupling optical elements of waveguides in the eyepiece. With such an arrangement, the sub pupils may also be placed closer together with less crosstalk, which results in a smaller overall system pupil and therefore smaller and lighter optics in the projector system.

With a shifted pupil system, multiple sub pupils may be used to provide images with different colors and/or for different depth planes. It will be appreciated that each light guide may correspond to a sub pupil, and a plurality of light guides provide a plurality of such sub pupils. In addition, sub pupil size may be directly related to the cross-sectional area of the light output surface 2120, with larger cross-sectional areas generally corresponding to larger sub pupil sizes. In order for the system to stay small, the pupils are preferably as small and close together as possible so that the overall system pupil is small. It will be appreciated that the system pupil will determine the size of the optics required and the weight of the display device as well. In addition, sub pupil size may limit the resolution of the system. Thus, sub pupils may have a certain size determined by the resolution that is desired for a given color. Since blue has a smaller wavelength than green or red, its sub pupil may be smaller and still have the same resolution. Sub pupil size is also related to the how much power may be introduced into the system through the sub pupil. The larger the sub pupil, the larger and more powerful a light emitter may be used.

The spacing and the closeness of sub pupils may be limited by one or more of light emitter size, light emitter placement tolerance, color crosstalk in the eyepiece, heating, and electrical considerations. In some embodiments, using a common electrical ground for the light emitters, two light or more emitters may be placed closer together; however, if they have different operating voltages then some efficiency may be sacrificed to have common grounds. In some embodiments, lens may be placed between the light input surface 2110 and then underlying light emitter. The lens may be used to collect light from a light emitter efficiently, although such lenses may limit how close together light emitters may be placed to the light input surface 2110.

Figure 14:
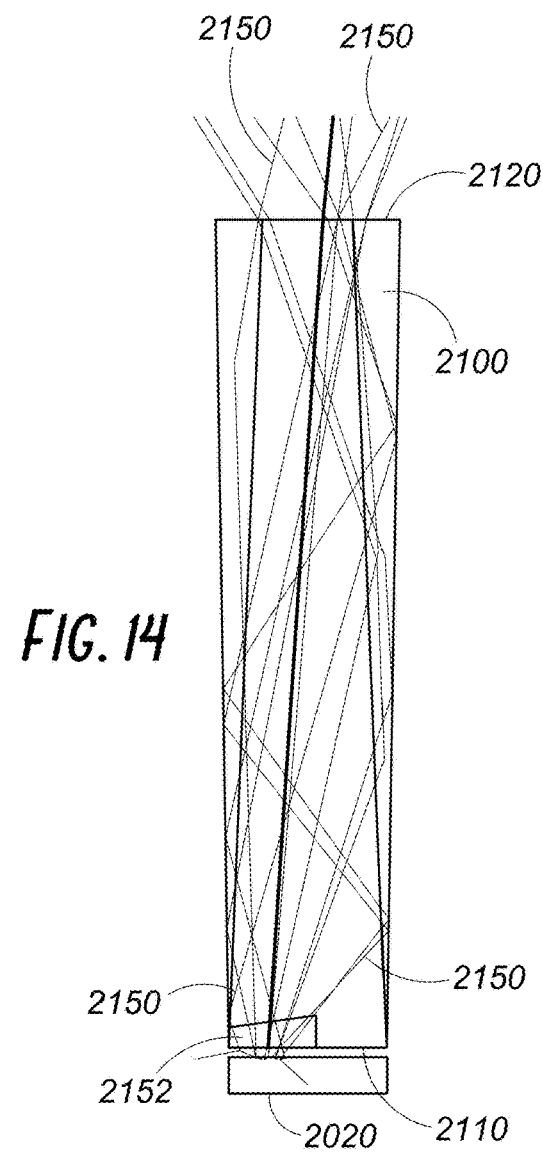
FIG. 14 illustrates rays of light propagating through the light pipe of FIGS. 13A and 13B.

With reference now to FIG. 14, rays 2150 of light propagating through the light pipe 2100 of FIGS. 13 and 13B are illustrated. It will be appreciated that FIG. 14 shows a 3-D view of the light pipe 2100, with an octagonal output surface 2120 tapering to a square input surface 2110, and with the walls of the light pipe shown as transparent to illustrate the paths of rays 2150 through the light pipe. Preferably, the light pipe 2100 is sized such that at least some of the light rays 2150 reflect off of the light pipe 2100 before exiting the output surface 2120. Such reflections may advantageously increase the spatial and the angular uniformity of the light exiting the light output surface 2120 relative to the light injected into the input surface 2110 from the light emitter 2020. In some embodiments, the light pipe 2100 may also or be attached to include a light redirecting feature 2152 configured to direct light through the light pipe 2100 along a predetermined path. For example, the light redirecting feature 2152 may be angled or have facets such that it steers light from an underlying light emitter 2120 towards the center of the light pipe 2100. In some embodiments, the light redirecting feature 2152 may be a prism.

In some embodiments, multiple light emitters may inject light into a single light pipe 2100 (see, e.g., FIG. 16A) and the light redirecting feature 2152 may advantageously be provided to direct light from each light emitter 2020b, 2020c through the light pipe 2100 for improved blending. For example, while the light emitters 2020b, 2020c may be provided at different locations at the input surface 2110, the light redirecting feature 2152 may be utilized to reduce differences in the paths of light that are outputted by the light pipe 2100 from each light emitter 2020b, 2020c and to improve the relative uniformity of light outputted by the light pipe 2100 from each light emitter.

It some embodiments, the surfaces of the sidewalls of the light pipe 2100 may be rough, which can help to improve the uniformity of outputted light by scattering light within the light pipe 2100. For example, the light pipe 2100 may be roughened by abrasion, e.g., by mechanical polishing or by subjecting the light pipe 2100 to a chemical mechanical polishing process using abrasive particles of a desired grit. In some other embodiments where the light pipe 2100 is formed in a mold, the desired light pipe sidewall roughness may be achieved by roughening ruffling the interior surface of the mold and then forming the light pipe 2100 in that mold, thereby transferring the roughness of the mold to the light pipe 2100. Consequently, an optical device may be formed by forming the light pipe 2100 with a roughened sidewall surface and then coupling the light pipe 2100 to one or more light emitters, which may then be coupled to a spatial light modulator or a polarizing beam splitter, in some embodiments. As noted above, forming a light pipe 2100 with a roughened sidewall surface may include roughening the sidewalls of the light pipe 2100, or forming the light pipe 2100 in the mold that has roughness on its interior surface that is transferred to the light pipe 2100.

Figure 15:
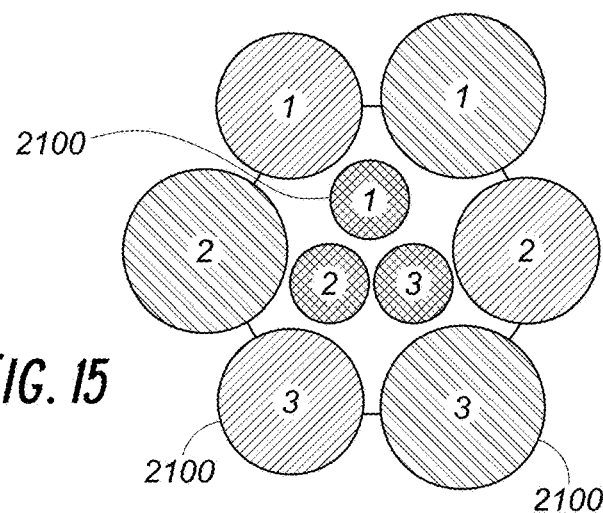
FIG. 15 illustrates a top-down cross-sectional view of a plurality of light pipes having different cross-sectional areas.

FIG. 15 illustrates a top-down cross-sectional view of a plurality of light pipes 2100 having different cross-sectional areas. The illustrated light pipes 2100 may be utilized to provide light of different colors to a waveguide stack and also may be utilized to provide light to waveguides corresponding to a plurality of depth planes. In display systems in which there are three component colors, the illustrated nine light pipes 2110 may be used to provide image information over three depth planes. In the illustrated example, light pipes 2100 transmit light of different colors which are identified by different shading, and the numbers 1, 2, and 3 indicate different depth planes.

Accordingly, FIG. 15 may be understood to show an example sub pupil layout with nine sub pupils. Red and green sub pupils may be larger and spread further apart to limit color crosstalk, which may be especially noticeable with green light. The blue sub pupils are smaller. However, this is not expected to negatively impact the amount of blue light delivered to the eyepiece since blue light emitters typically have higher power densities. Advantageously, blue sub pupils may be smaller than other sub pupils and still support a higher resolution. Examples of dimensions for sub pupils (and the light output surface 2120 of the light pipe 2100 (FIGS. 13A-13B)) range from 200 um to 3 mm diameters. As one example, the diameters of the various sub pupils may be 0.6 mm for blue, 1 mm for red, and 0.8 mm for green. Preferred sizes range from 400 um diameter to 1.5 mm diameter.

Figure 16A:
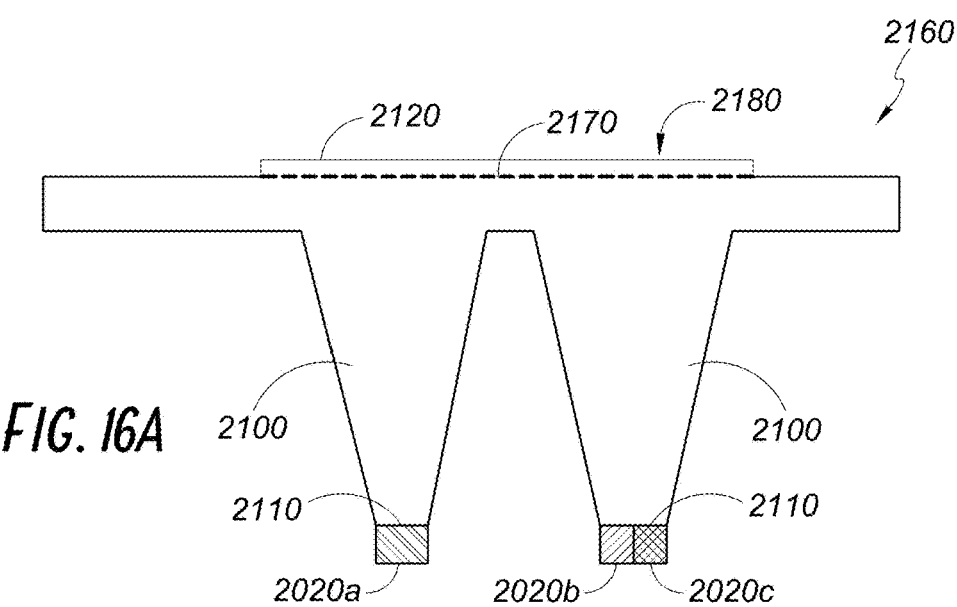
FIGS. 16A and 16B illustrate cross-sectional side views of a plurality of light pipes formed as an integral unit.
Figure 16B:
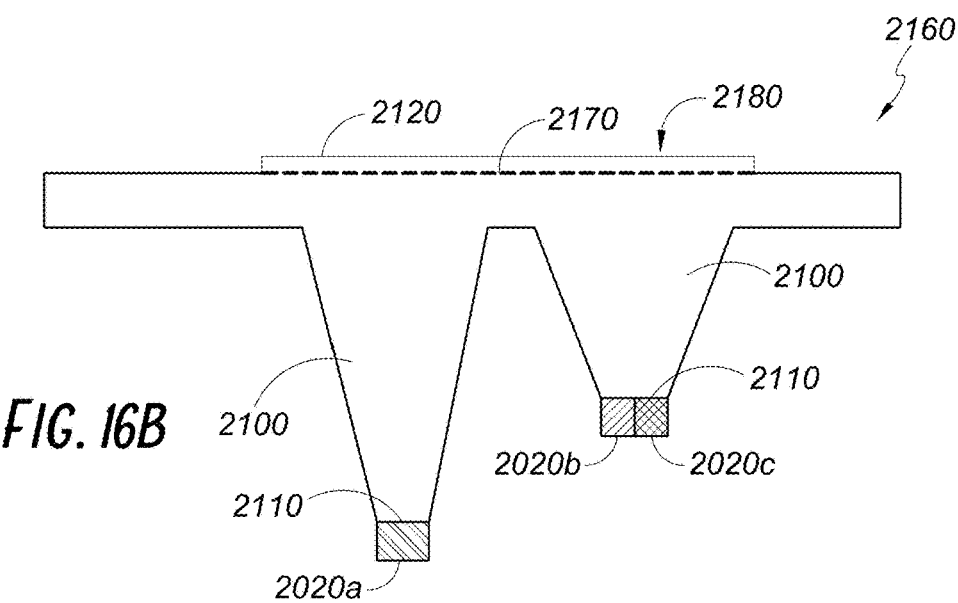

In some embodiments, a plurality of light pipes 2100 may be formed as an integral unit. FIGS. 16a and 16B illustrate a cross-sectional side view of a plurality of light pipes 2100 formed as an integral unit 2160. FIGS. 16A and 16B illustrates at least two advantageous concepts. First, the alignment and assembly of the light pipes 2100 to the light emitters 2020 may be simplified by molding them into a single larger part 2160. Subsequently, the single part 2160 may be aligned as a unit to the light emitters 2020 that are located on a substrate (e.g. a PCB board) (not shown).

In some embodiments, the output surface 2120 may have a diffuser 2170 fabricated into it to increase the uniformity of the light outputted from that surface. In some other embodiments, the diffuser 2170 may be a separate structure attached (e.g., adhered by index matched adhesive) to the output surface 2120. In some embodiments, an anti-reflection coating 2180 may be provided at the output surface 2120. As noted above, the input surfaces 2110 of the various light pipes 2100 may also be glued or made part of the encapsulation material of the light emitters 2020 to provide a better optical interface to improve throughput and collection efficiency.

It will be appreciated that the right light pipe 2100 illustrated in FIG. 16 has two associated light emitters 2020b, 2020c. In some other embodiments, each light pipe 2100 of the integral structure 2160 may only have one associated light emitter 2020.

Nevertheless, another advantageous concept shown in FIGS. 16A and 16B is the use of a single light pipe 2100 to combine the output of two or more light emitters 2020 into a uniform sub pupil with a given na. This arrangement may be helpful in making the size and weight of the projector system smaller (compared to an arrangement in which light pipes 2100 only have an associated single light emitter 2020) by reducing the size of the overall system pupil that contains the sub pupils. The projection of different component colors to the waveguide stack may still be time division multiplexed and the gratings and filters in the waveguide stack may be used to separate the colors into the correct waveguide. The input surface 2110 may be designed to cover most of the emitting surfaces of the multiple light emitters 2020, or may be designed to be larger than the emitting surface areas so that light from the various light emitters (e.g., light emitters 2020a, 2020b, 2020c, FIGS. 16A and 16B) is captured into the light pipe 2100. The multiple bounces or reflections of light rays in the light pipe can make the pupil more uniform in intensity and in angular spread. Combining the light pipe 2100 and a diffuser 2170 may also be helpful in improving the angular uniformity. With reference to FIG. 16B, it will be appreciated that the light pipes 2100 may have different heights depending upon the light emitters configured to inject light into the light pipes. For example, light emitters 2020a, 2020b, 2020c may emit light of different colors and light emitters 2020b, 2020c that emit light of shorter wavelengths than the light emitter 2020a. As a result, light emitters 2020b, 2020c may utilize a shorter light pipe 2100 than the light emitter 2020a, as illustrated in FIG. 16B. In addition, it will be appreciated that while illustrated as being formed as integral unit, standalone light pipes 2100 that are not formed as integral unit may also have different heights depending upon the wavelengths of light that are emitted by light emitters optically coupled to the light pipes.

Figure 17:
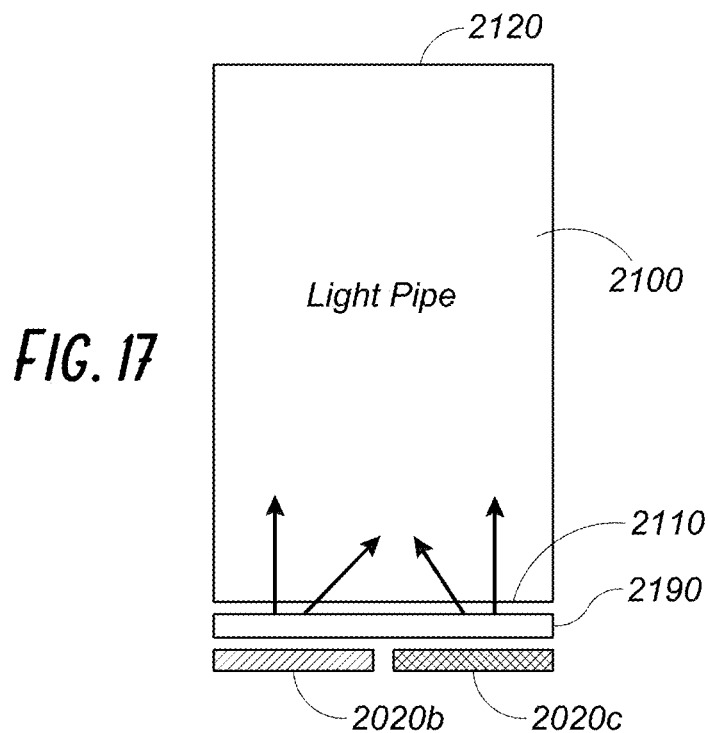
FIG. 17 illustrates a single light pipe for transmitting light from a plurality of light emitters, with an optical structure intervening between the light emitters and the light pipe.

In some embodiments, combining wedges, prisms, or gratings with the the input surface 2110 may also improve the uniformity of light exiting the light output surface 2120. FIG. 17 illustrates a single light pipe for transmitting light from a plurality of light emitters 2020, with an optical structure 2190 intervening between the light emitters 2020 and the light pipe 2100. It will be appreciated that the optical structure 2190 may be one or more of wedges, prisms, or gratings which can redirect light entering into the light pipe 2100. The optical structure 2190 may help to diffuse the light or control its propagation to improve the uniformity of light that is ultimately projected out of output surface 2120. It will be appreciated that the optical structure 2190 may be formed as integral part of the input surface 2110, or may be a separately formed structure that is attached (e.g. using an index-matched adhesive) to the input surface 2110.

Figure 18:
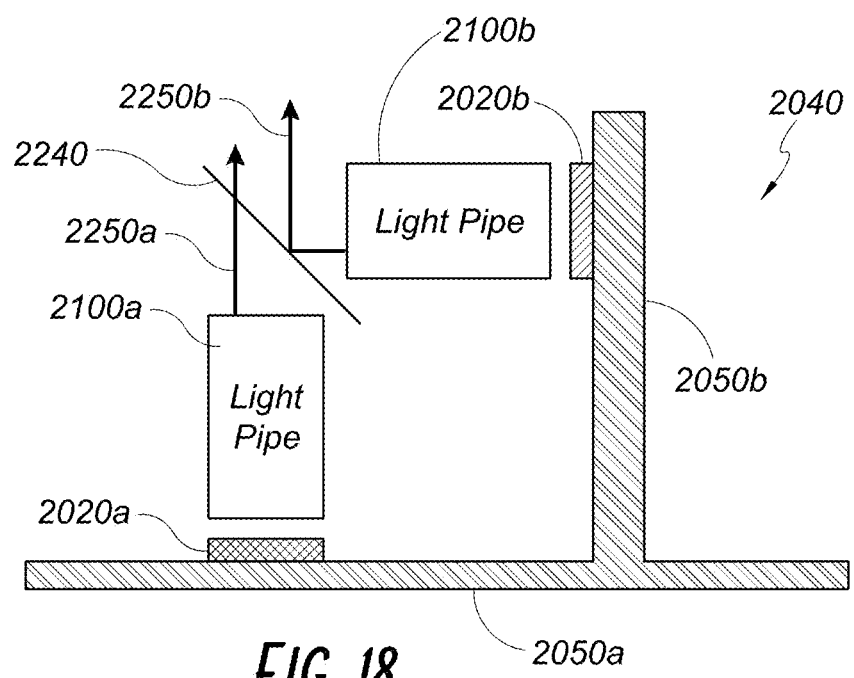
FIG. 18 illustrates a light module that outputs light from two different light emitters onto a single area.

Another approach for reducing projector system size and weight is to combine the light output from the light emitters 2020 after the light has been captured by a light pipe for each light emitter. FIG. 18 illustrates a light module 2040 that directs light from two different light emitters 2020a, 2020b onto a single common area. A substrate 2015a supports a light emitter 2020a which is configured to inject light into the light pipe 2100a. Similarly, a substrate 2015b supports a light emitter 2020b which is configured to inject light into the light guide 2100b. Light exiting the light pipes 2100a and 2100b propagate in different crossing directions and preferably cross at a partially transmissive reflector 2240. For example, the crossing directions may be orthogonal to one another, and the light pipes 2100a and 2100b may also be orthogonal to one another. In some embodiments, the partially transmissive reflector 2240 is a dichroic mirror, which may be configured to selectively transmit light from the light pipe 2100a and to selectively reflect light from the light pipe 2100b. It will be appreciated that the light emitters 2020a, 2020b may emit light of different wavelengths, and the selectivity of the partially transmissive reflector maybe wavelength dependent.

Figure 19A:
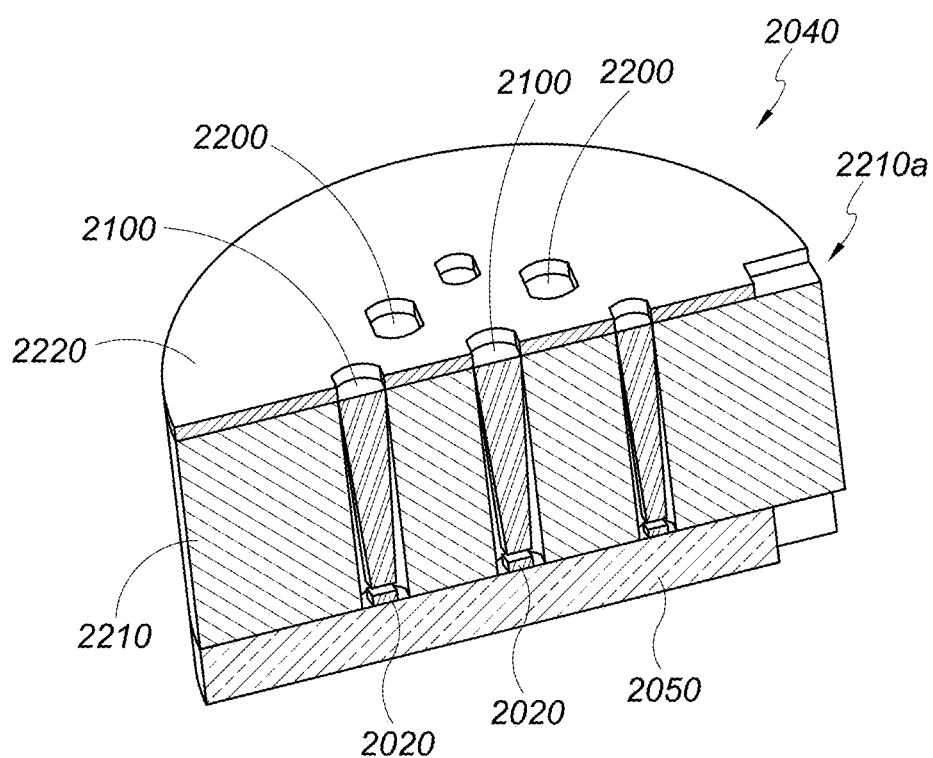
FIG. 19A illustrates a cross-sectional perspective view of a light module having a baffle around light pipes.
Figure 19B:
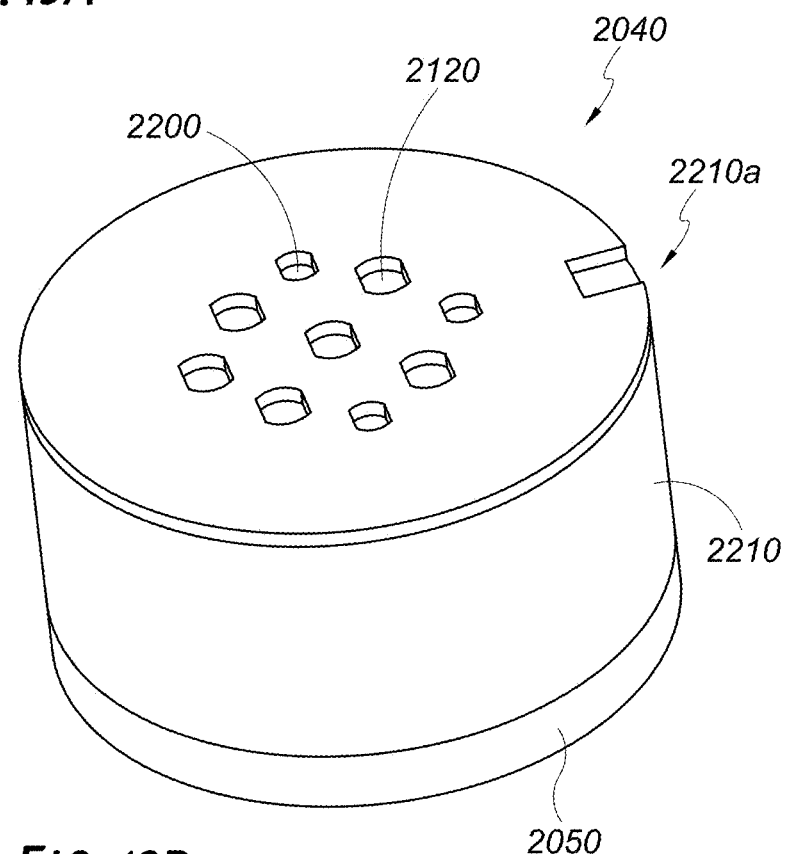
FIG. 19B illustrates a perspective view of a light module having a baffle.

As noted above, it will be appreciated that crosstalk and/or light leakage between light guides may degrade the quality of images formed using the projector system. In some embodiments, a baffle is provided to optically separate the light pipes. FIG. 19A illustrates a cross-sectional perspective view of a light module 2040 having a baffle structure 2210a around light pipes 2100. FIG. 19B illustrates a perspective view of the light module 2040 having with the same baffle structure 2210a.

The baffle structure includes a lower portion 2210 that surrounds and closes sidewalls of the light pipes 2100, and an upper portion or lid 2220 which fits over the lower portion 2210. The lower portion 2210 may be attached to the substrate 2050 that supports the light emitters 2020. The upper portion 2220 may include a plurality of apertures 2200 through which light exiting the output surface 2120 may propagate. In some embodiments, the apertures 2200 may be smaller in area than the light output surface 2120, and may have a desired shape for outputting light to the light modulator.

Figure 20:
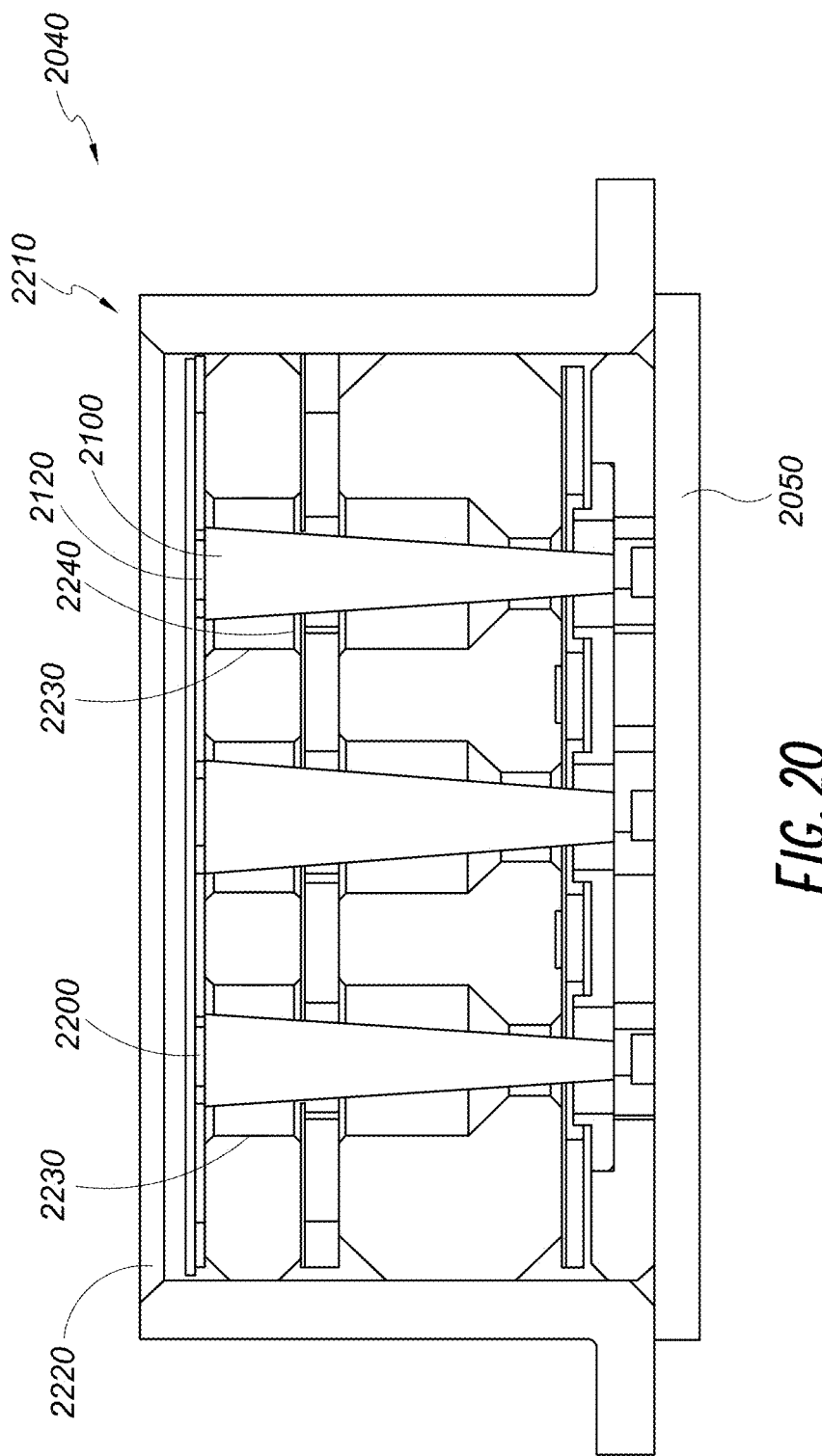
FIG. 20 illustrates a cross-sectional side view of a light module having a baffle around light pipes.

FIG. 20 illustrates a cross-sectional side view of the light module 2040 having the baffle 2210a around light pipes 2100. In some embodiments, the light pipes may be separated from the interior walls 2230 of the baffle 2210. For example, the separation may be achieved by spacers 2240, which make minimal contact with the surfaces of the light pipe 2100, to prevent interfering with the propagation of light within the light pipe 2100. Preferably, the interior walls 2230 of the baffle 2210 performed of light absorbing material.

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the augmented reality content disclosed herein may also be displayed by systems that provide images on a single depth plane.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A display system comprising:
   a plurality of light pipes;
   a plurality of light sources configured to emit light into the light pipes; and
   a spatial light modulator configured to modulate light received from the light pipes to form a plurality of component color images,
   wherein each of the light pipes comprises first and second opposing ends and a sidewall extending from the first end to the second end,
   wherein the first end comprises a light input surface configured to receive light from an associated light source,
   wherein the second end comprises a light output surface configured to output light to the spatial light modulator,
   wherein each light pipe is oriented to localize outputted light on a different location on the spatial light modulator than other light pipes, and
   wherein the display system is configured to form different ones of the plurality of component color images at the different locations receiving light from the light pipes.

2. The display system of claim 1, wherein the light output surface of each of the light pipes has a larger area than the light input surface of the respective light pipe.

3. The display system of claim 1, wherein at least one of the light pipes are proximate to and configured to receive light from a corresponding two or more of the light sources through the light input surface of the at least one of the light pipes.

4. The display system of claim 3, wherein a first light pipe of the plurality of light pipes has a first height between a light input surface and a light output surface of the first light pipe, wherein a second light pipe of the plurality of light pipes has a second height between a light input surface and a light output surface of the second light pipe, wherein the first height is different from the second height.

5. The display system of claim 1, wherein the light input surface of each of the light pipes has a first geometry and the associated light output source has a second geometry different from the first geometry.

6. The display system of claim 5, wherein the plurality of light pipes each have an associated inner width.

7. The display system of claim 6, wherein the inner width varies throughout a length of a light pipe.

8. The display system of claim 3, wherein each of the corresponding two or more of the light sources are configured to emit light of different ranges of wavelengths.

9. The display system of claim 3, wherein the at least one of the light pipes comprises a light redirecting feature at the light input end.

10. The display system of claim 9, wherein the light redirecting feature comprises one or more of a diffuser, a grating, and a prism.

11. The display system of claim 3, further comprising:
    a stack of waveguides, each waveguide comprising a light incoupling optical element configured to receive light from the spatial light modulator,
    wherein the light incoupling optical element of one or more first waveguides is spatially offset from the light incoupling optical element of two or more other waveguides, as seen in a plan view viewed from a direction along the axis of propagation of the light into the stack, and
    wherein the light incoupling optical elements of at least two of the two or more other waveguides at least partially overlap, as seen in the plan view.

12. The display system of claim 11, wherein the light incoupling optical elements of at least two of the two or more other waveguides are configured to incouple light from different ones of the corresponding two or more of the light sources,
    wherein the light incoupling optical elements of at least two of the two or more other waveguides are laterally shifted relative to one another such that none of the light incoupling optical elements of at least two of the two or more other waveguides are centered on a light pipe transmitting light to be incoupled into the two or more other waveguides.

13. The display system of claim 12, wherein each waveguide of the stack of waveguides comprises a light outcoupling optical element configured to output incoupled light with different amounts of divergence in comparison to one or more other waveguides of the stack of waveguides.

14. The display system of claim 1, wherein two or more of the light pipes are part of a unitary piece of optically transmissive material.

15. The display system of claim 14, wherein all of the plurality of light pipes are part of the unitary piece of optically transmissive material.

16. The display system of claim 1, wherein one or more light sources are configured to emit light of different wavelengths than other light sources.

17. The display system of claim 16, wherein the light sources form groups of light sources, wherein each group emits light of a different range of wavelengths.

18. The display system of claim 17, wherein the light sources form three groups of light sources, wherein a first of the groups emit red light, wherein a second of the groups emit green light, and wherein a third of the groups emit blue light.

19. The display system of claim 16, wherein one or more light pipes have different heights than other light pipes.

20. The display system of claim 19, wherein the heights of the light pipes varies depending upon the wavelengths of light emitted by the light source corresponding to the light pipe.

21. The display system of claim 20, wherein the heights of the light pipes increase as an average wavelength of light emitted by a corresponding light source increases.

22. The display system of claim 1, wherein the spatial light modulator comprises a liquid crystal display (LCD) or a digital light processing (DLP) display.

23. The display system of claim 1, further comprising a diffuser at the light output end of the light pipe.

24. The display system of claim 1, further comprising baffling configured to block light leakage between each of the light pipes.

25. The display system of claim 1, wherein one or more of the light pipes have a different maximum width than other light pipes.

26. The display system of claim 1, wherein the light sources comprise a blue light emitter and further comprising a color-changing film comprising:
one or more of a phosphor and quantum dot configured to receive blue light from and emit light of another color.

27. The display system of claim 26, wherein the color-changing film is on the surface of one or more of the light pipes.

28. The display system of claim 1, further comprising a stack of waveguides, each waveguide comprising a light incoupling optical element configured to receive light from the spatial light modulator.

29. The display system of claim 28, wherein the light incoupling optical element of each waveguide is spatially offset from the light incoupling optical element of other waveguides, as seen in a plan view viewed from a direction along the axis of propagation of the light into the stack.

30. The display system of claim 29, wherein, as seen in a plan view, a spatial arrangement of light output ends of the light pipes corresponds one-to-one with a spatial arrangement of the light incoupling optical elements.

31. The display system of claim 28, wherein each waveguide of the stack of waveguides comprises a light outcoupling optical element configured to output light with different amounts of divergence in comparison to one or more of the other waveguides of the stack of waveguides.

32. The display system of claim 1, wherein the light pipes comprise plastic or glass.

33. The display system of claim 1, further comprising a prism interposed between a light source and a light pipe.

34. A display system comprising:
a partially transmissive reflector;
a first light source;
a first light pipe proximate to and configured to:
receive light from the first light source; and
direct the light from the first light source to the reflector in a first direction;
a second light source;
a second light pipe proximate to and configured to:
receive light from the second light source; and
direct the light from the second light source to the reflector in a second direction,
wherein the partially transmissive reflector is configured to:
transmit light from the first light source; and
reflect light from the second light source,
wherein each of the light pipes comprises first and second opposing ends and a sidewall extending from the first end to the second end,
wherein the first end comprises a light input surface configured to receive light from an associated light source,
wherein the second end comprises a light output surface configured to output light to the spatial light modulator, and
wherein each light pipe is oriented to localize outputted light on a different location on the spatial light modulator than other light pipes.

35. The display system of claim 34, wherein light from the first light source has a different range of wavelengths than light from the second light source.

36. The display system of claim 34, wherein the partially transmissive reflector is a dichroic mirror.

* * * * *